US011225280B2

(12) United States Patent
Sugishita

(10) Patent No.: US 11,225,280 B2
(45) Date of Patent: Jan. 18, 2022

(54) STEERING DEVICE

(71) Applicant: NSK Ltd., Tokyo (JP)

(72) Inventor: Suguru Sugishita, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 17/041,872

(22) PCT Filed: Mar. 27, 2019

(86) PCT No.: PCT/JP2019/013374
§ 371 (c)(1),
(2) Date: Sep. 25, 2020

(87) PCT Pub. No.: WO2019/189473
PCT Pub. Date: Oct. 3, 2019

(65) Prior Publication Data
US 2021/0009186 A1 Jan. 14, 2021

(30) Foreign Application Priority Data

Mar. 27, 2018 (JP) .............................. JP2018-059631
Apr. 6, 2018 (JP) .............................. JP2018-074164
(Continued)

(51) Int. Cl.
*B62D 1/18* (2006.01)
*B62D 1/184* (2006.01)
(Continued)

(52) U.S. Cl.
CPC .............. *B62D 1/18* (2013.01); *B62D 1/184* (2013.01); *B62D 1/189* (2013.01); *B62D 1/185* (2013.01); *B62D 5/0409* (2013.01)

(58) Field of Classification Search
CPC .......... B62D 1/18; B62D 1/184; B62D 1/187; B62D 1/185; B62D 1/189
See application file for complete search history.

(56) References Cited

U.S. PATENT DOCUMENTS 5,199,319 A * 4/1993 Fujiu ...................... B62D 1/184
280/775
5,338,064 A * 8/1994 Sadakata ................ B62D 1/184
280/775
(Continued)

FOREIGN PATENT DOCUMENTS

CA         2276936 A1 * 11/2000 ............. B62D 1/184
CN       102112362 A  *  6/2011 ............. B62D 1/195
(Continued)

OTHER PUBLICATIONS

International Search Report (PCT/ISA/210) issued in PCT Application No. PCT/JP2019/013374 dated Jun. 4, 2019 with English translation (four (4) pages).
(Continued)

*Primary Examiner* — Nicole T Verley
(74) *Attorney, Agent, or Firm* — Crowell & Moring LLP

(57) ABSTRACT

A steering device includes a pressing plate provided in a section of the adjustment rod protruding from the outside surface of one support plate section as a locked member. The pressing plate has a circular plate body externally fitted onto the adjustment rod and a locking plate section as an extended arm section. A tension spring is bridged between a section shifted in the width direction from the plate body of the locking plate section and the support bracket.

6 Claims, 25 Drawing Sheets

(30) Foreign Application Priority Data

Apr. 11, 2018 (JP) ............................. JP2018-075911
Aug. 24, 2018 (JP) ............................. JP2018-156901

(51) Int. Cl.
*B62D 1/189* (2006.01)
*B62D 1/185* (2006.01)
*B62D 5/04* (2006.01)

(56) References Cited

U.S. PATENT DOCUMENTS

| | | | | |
|---|---|---|---|---|
| 5,655,413 | A * | 8/1997 | Barton | B62D 1/184 74/493 |
| 6,189,405 | B1 * | 2/2001 | Yazane | B62D 1/184 180/444 |
| 2002/0020244 | A1 * | 2/2002 | Janeczko | B62D 1/184 74/493 |
| 2003/0217613 | A1 * | 11/2003 | Sato | B62D 1/184 74/493 |
| 2005/0178231 | A1 * | 8/2005 | Schick | B62D 1/184 74/493 |
| 2007/0295145 | A1 * | 12/2007 | Sekii | B62D 1/184 74/493 |
| 2008/0231030 | A1 * | 9/2008 | Menjak | B62D 1/184 280/775 |
| 2009/0019963 | A1 | 1/2009 | Hubrecht et al. | |
| 2015/0375771 | A1 * | 12/2015 | Tinnin | B62D 1/185 74/493 |
| 2017/0274923 | A1 * | 9/2017 | Uesaka | B62D 1/19 |
| 2018/0022376 | A1 | 1/2018 | Sugishita | |
| 2019/0047608 | A1 * | 2/2019 | Ishikawa | B62D 1/184 |
| 2019/0283792 | A1 * | 9/2019 | Suzuki | B62D 1/184 |
| 2019/0337552 | A1 * | 11/2019 | Buzzard | B62D 1/184 |
| 2020/0317253 | A1 * | 10/2020 | Huber | B62D 1/195 |

FOREIGN PATENT DOCUMENTS

| | | | | |
|---|---|---|---|---|
| CN | 104670298 | A * | 6/2015 | |
| CN | 105358406 | A * | 2/2016 | ............. B62D 1/185 |
| CN | 107110312 | A * | 8/2017 | ............. F16H 35/18 |
| CN | 107487353 | A * | 12/2017 | |
| CN | 112339853 | A * | 2/2021 | |
| DE | 3619125 | C1 * | 10/1987 | ............ F16B 5/0225 |
| DE | 19839496 | A1 * | 3/2000 | ............ B62D 1/184 |
| DE | 19915341 | A1 * | 10/2000 | ............ B62D 1/184 |
| DE | 10217534 | A1 * | 11/2003 | ............ B62D 1/184 |
| DE | 102008007094 | A1 * | 9/2009 | ............ B62D 1/195 |
| DE | 102012104055 | A1 * | 11/2013 | ............ B62D 1/184 |
| DE | 102012109079 | A1 * | 3/2014 | ............ B62D 1/195 |
| DE | 102013016534 | B3 * | 12/2014 | ............ B62D 1/184 |
| EP | 1500570 | A2 * | 1/2005 | ............ B62D 1/184 |
| EP | 1747966 | A2 * | 1/2007 | ............ B62D 1/195 |
| EP | 3666624 | A1 * | 6/2020 | ............ B62D 1/184 |
| FR | 2822782 | A1 * | 10/2002 | ............ B62D 1/184 |
| FR | 2933058 | A1 * | 1/2010 | ............ B62D 1/184 |
| FR | 2962101 | A1 * | 1/2012 | ............ B62D 1/184 |
| GB | 2352286 | A * | 1/2001 | ............ B62D 1/184 |
| GB | 2415485 | A * | 12/2005 | ............ B62D 1/184 |
| GB | 2456040 | A * | 7/2009 | ............ B62D 1/184 |
| GB | 2465179 | A * | 5/2010 | ............ B62D 1/184 |
| GB | 2521518 | A * | 6/2015 | ............ B62D 1/184 |
| JP | 62-23772 | U | 2/1987 | |
| JP | 2009-18781 | A | 1/2009 | |
| JP | 2009-196436 | | 9/2009 | |
| JP | 2014-83906 | A | 5/2014 | |
| JP | 2014-172569 | A | 9/2014 | |
| JP | 2015-214291 | A | 12/2015 | |
| JP | 2016-94950 | A | 5/2016 | |
| JP | 2017-1569 | A | 1/2017 | |
| JP | 2017-81516 | A | 5/2017 | |
| JP | 2018-127041 | A | 8/2018 | |
| JP | 6819332 | B2 * | 1/2021 | |
| KR | 10-1465496 | B1 | 8/2014 | |
| KR | 20160050315 | A * | 5/2016 | |
| RU | 171216 | U1 * | 5/2017 | |
| WO | WO-2016114327 | A1 * | 7/2016 | ............ F16H 25/186 |
| WO | WO 2016/186144 | A1 | 11/2016 | |
| WO | WO-2017057754 | A1 * | 4/2017 | ............ B62D 1/189 |

OTHER PUBLICATIONS

Japanese-language Written Opinion (PCT/ISA/237) issued in PCT Application No. PCT/JP2019/013374 dated Jun. 4, 2019 (five (5) pages).

English translation of International Preliminary Report on Patentability (PCT/IPEA/409) issued in PCT Application No. PCT/JP2019/013374 dated Jun. 4, 2019 (six (6) pages).

* cited by examiner (A)

(B)

(A)

(B)

STEERING DEVICE

TECHNICAL FIELD

The present invention relates to a steering device comprising a position adjustment device for a steering wheel.

BACKGROUND ART

As illustrated in FIG. 23, the steering device transmits rotation of a steering wheel 1 to an input shaft 3 of a steering gear unit, and a pair of left and right tie rods are pushed or pulled based on the rotation of the input shaft 3 to hereby give a steering angle to front wheels. The steering device comprises a steering shaft 5 and a cylindrical steering column 6 which supports the steering shaft 5 so as to be able to rotate freely in a state where the steering shaft 5 is inserted in the axial direction through the inside of the steering column 6. The front end portion of the steering shaft 5 is connected to the rear end portion of an intermediate shaft 8 by way of a universal joint 7, and the front end portion of the intermediate shaft 8 is connected to the input shaft 3 by way of another universal joint 9. Here, unless specified otherwise, the forward-backward direction, the width direction, and the up-down direction mean the forward-backward direction, the width direction, and the up-down direction of a vehicle body.

The steering device may comprise a tilt mechanism for adjusting the up-down position of the steering wheel 1 and a telescopic mechanism for adjusting the forward-backward position of the steering wheel 1. In the illustrated construction, a gear housing 10 which is fastened to the front section of the steering column 6 is supported by the vehicle body 11 so as to be able to pivotally displace by way of the tilt axis 12 that is provided in the width direction. A displacement bracket 13 is provided below the steering column 6, and a support bracket 14 is provided in a position so as to sandwich the displacement bracket 13 from both sides in the width direction. The support bracket 14 has a long hole 15 in the up-down direction that extends in the up-down direction, and the displacement bracket 13 has a long hole 16 in the forward-backward direction that extends in the forward-backward direction. An adjustment rod 17 is provided so as to be inserted in the width direction of the long hole 15 in the up-down direction and the long hole 16 in the forward-backward direction. The steering shaft 5 and the steering column 6 comprise an extendable and contractable mechanism. By adjusting the clamping force with which the support bracket 14 holds the displacement bracket 13 from both sides in the width direction, the up-down position and the forward-backward position of the steering wheel 1 can be adjusted.

A specific configuration of the steering device comprising the position adjustment device for a steering wheel will be described with reference to FIG. 24 and FIG. 25. FIG. 25 illustrates a configuration similar to that described in JP2015-214291(A).

The steering column 6 comprises an outer column 18 that is provided on the rear side and an inner column 19 that is provided on the front side, and is configured so that the front section of the outer column 18 and the rear section of the inner column 19 are fitted to each other so as to be able to relatively displace in the axial direction and to be able to extend or contract the entire length. The outer column 18 comprises a slit 20 at its front section, and the inner diameter of the front section of the outer column 18 can be elastically expanded or contracted. The outer column 18 comprises a pair of clamped plate sections 21a, 21b of the displacement bracket 13 in a section sandwiching the slit 20 from both sides in the width direction. The pair of clamped plate sections 21a, 21b has long holes 16a, 16b in the forward-backward direction. The support bracket 14 comprises a pair of support plate sections 22a, 22b, and the pair of support plate sections 22a, 22b has long holes 15a, 15b in the up-down direction. The adjustment rod 17 is arranged so as to pass through the pair of long holes 15a, 15b in the up-down direction and the pair of long holes 16a, 16b in the forward-backward direction.

The base section of the adjustment lever 23 is fastened to a portion on one end side of the adjustment rod 17 that protrudes from the outside surface of one support plate sections 22a of the pair of support plate sections 22a, 22b. A cam apparatus 24 is provided between the outside surface of the one support plate sections 22a and the base section of the adjustment lever 23. The cam apparatus 24 comprises a driving-side cam 25 and a driven-side cam 26, and is able to expand or contract the dimension in the width direction based on the relative rotation of these cams. The driven-side cam 26 comprises an engaging convex section 27 on its inside surface, and the engaging convex section 27 engages with the long hole 15a in the up-down direction of the one support plate section 22a so as to be able to displace only along the long hole 15a in the up-down direction. The driving-side cam 25 can be rotated together with the adjustment rod 17 by the adjustment lever 23. On the other end side of the adjustment rod 17, a nut 28 is screwed onto a section protruding from the outside surface of the other support plate sections 22b of the pair of support plate sections 22a, 22b. A thrust bearing 29 and a pressing plate 30 are provided between the outside surface of the other support plate sections 22b and the nut 28.

When the adjustment lever 23 is swung in a specified direction in order to adjust the position of the steering wheel 1, the driving-side cam 25 is rotated in the unlocking direction, the dimension in the width direction of the cam apparatus 24 is reduced, and the space between the driven-side cam 26 and the pressing plate 30 is increased. As a result, the surface pressure of the area of contact between the inside surfaces of the support plate sections 22a, 22b and the outside surfaces of the clamped plate sections 21a, 21b is either reduced or lost, and at the same time, the inner diameter of the front section of the outer column 18 is elastically increased so that the surface pressure of the area of contact between the inner circumferential surface of the front section of the outer column 18 and the outer circumferential surface of the rear section of the inner column 19 is reduced. In this unclamping state, the up-down position and the forward-backward position of the steering wheel 1 can be adjusted within a range in which the adjustment rod 17 can move inside the long holes 15a, 15b in the up-down direction and the long holes 16a, 16b in the forward-backward direction.

After the steering wheel 1 has been moved to a desired position, the adjustment lever 23 is swung in the opposite direction from the specified direction. Due to this, the driving-side cam 25 is rotated in the locking direction, the dimension in the width direction of the cam apparatus 24 is increased, and the space between the inside surfaces of the pair of support plate sections 22a, 22b is reduced. As a result, the surface pressure of the area of contact between the inside surfaces of the support plate sections 22a, 22b and the outside surfaces of the clamped plate sections 21a, 21b is increased, and at the same time, the inner diameter of the front section of the outer column 18 is elastically reduced so that the surface pressure of the area of contact between the inner circumferential surface of the front section of the outer column 18 and the outer circumferential surface of the rear section of the inner column 19 is increased. In this clamping state, the up-down position and the forward-backward position of the steering wheel 1 after adjustment is maintained.

The steering device may comprise a spring 31 in order to prevent the steering column 6 from tilting in a direction in which the steering wheel 1 falls when the clamping force is released. One end section of the spring 31 is locked to the support bracket 14, and the other end section of the spring 31 elastically contacts the lower surface of the pressing plate 30. The spring 31 applies an upward force in a direction substantially along the extending direction of the long hole 15*b* in the up-down direction. Therefore, when the position of the steering wheel 1 is adjusted, the tilting of the steering column 6 is prevented, and the adjustment of the up-down position of the steering wheel 1 can be performed with a light force.

RELATED LITERATURE

Patent Literature

[Patent Literature 1] JP 2015-214291(A)

SUMMARY OF INVENTION

[Problem to be Solved by Invention]

In the conventional structure, when the dimension in the width direction of the cam apparatus 24 is reduced and the support bracket 14 releases the clamping force that clamps the displacement bracket 13 from both sides in the width direction in order to adjust the position of the steering wheel 1, looseness in the width direction is likely to occur in members arranged on both end sides of the adjustment rod 17. Specifically, the cam apparatus 24 that is arranged on one end side of the adjustment rod 17 tends to rattle in the width direction between the outside surface of one support plate sections 22*a* and the base section of the adjustment rod 17, as well as the thrust bearing 29 and the pressing plate 30 that are arranged on the other end side of the adjustment rod 17 tend to rattle in the width direction between the outside surface of the other support plate sections 22*b* and the inside surface of the nut 28. Therefore, when the clamping force is released, due to the weight of the adjustment lever 23, the one end side of the adjustment rod 17 is likely to tilt so as to be displaced downward. As a result, when adjusting the up-down position of the steering wheel 1, the adjustment rod 17 cannot be smoothly displaced in the long hole 15*a* in the up-down direction, and therefore the adjustment lever 23 vibrates (moves) up and down so as to easily generate noise.

Taking into consideration the situation above, the object of the present invention is to provide a steering device that is able to suppress occurrence of looseness in the width direction in a member that is provided around sections that protrudes from the outside surface of the support plate sections of the adjustment rod when the clamping force is released in order to adjust the position of the steering wheel.

[Means for Solving Problems]

The steering device of the present invention comprises a steering column, a displacement bracket, a support bracket, an adjustment rod, a pair of pressing sections, and an expansion and contraction device.

The steering column is for rotatably supporting a steering shaft in a state where the steering shaft is inserted in the steering column in the axial direction. The steering column has a cylindrical shape, and is attached to a vehicle body or a member that is able to be fastened to the vehicle body, and is provided in the width direction, and is possible to pivotally displace around the tilt axis that supports the steering column or the member that is fastened to the steering column. The steering column can be configured by an inner column and an outer column that is arranged on the rear side of the inner column and is fitted to the inner column so as to be able to relatively displace in the axial direction.

The displacement bracket is provided in a part of the steering column and has column side through holes that passes through the displacement bracket in the width direction. When the steering device of the present invention comprises a telescopic mechanism, the column side through holes can be configured by forward-backward direction long holes (long holes for telescopic adjustment) that extend in the forward-backward direction. When the steering device of the present invention does not comprise a telescopic mechanism, the column side through holes can be configured by circular holes.

The support bracket comprises an installation plate section, a pair of support plate sections arranged on both sides in the width direction of the displacement bracket, and a pair of long holes in the up-down direction (tilt adjusting long holes) provided in the pair of support plate sections and extending in the up-down direction.

The adjustment rod passes through the column side through holes and the pair of long holes in the up-down direction in the width direction.

The pair of pressing sections are arranged on both end sides of the adjustment rod at sections protruding from the outside surfaces of the pair of support plate sections.

The expansion and contraction device comprises a mechanism that expands and contracts the space between the pair of pressing sections.

Especially, in the steering device of the present invention, a locked member is arranged on the support bracket at a portion of the adjustment rod protruding from the outside surface of any one support plate section of the pair of support plate sections, and the locked member comprises an outer fitting section having an insertion hole through which the adjustment rod is inserted and externally fitted onto the adjustment rod, and an extended arm section extended from part of the outer fitting section, and the extended arm section comprises a section shifted in the width direction from the outer fitting section, and a tension spring is bridged between the section shifted in the width direction from the outer fitting section of the extended arm section and the support bracket. A tension force is applied to the locked member from the tension spring, and a moment is applied to the locked member by using the tension force.

If the locked member is a member provided in the section of the adjustment rod protruding from the outside surface of any one support plate section of the pair of support plate sections, its function and type are not limited. The locked member may be provided independently, but is may be configured by any one pressing section of the pair of pressing sections or part thereof, or by the expansion and contraction mechanism or part thereof. For example, the locked member may be configured by a member such as a cam apparatus, an adjustment lever, and a washer, which is provided in a section of the adjustment rod protruding from the outside surface of one support plate section of the pair of support plate sections, or by a member such as a pressing plate or a bearing ring of a thrust bearing which is provided in a section of the adjustment rod protruding from the outside surface of the other support plate section of the pair of support plate sections.

The extended arm section may have an L-shape and may comprise a base half section that extends in the width direction from the outer circumferential edge of the outer fitting section and is arranged at a right angle to the outer fitting section, and a top half section that is bent at a right angle from an end section in the width direction of the base half section toward the opposite side of the outer fitting section. In this case, the section shifted in the width direction from the outer fitting section of the extended arm section is configured by the top half section.

The extended arm section may have a flat plate shape and may extend obliquely in a direction toward a side opposite to the outer fitting section toward outside in the width direction from the outer circumferential edge of the outer fitting section. In this case, the section shifted in the width direction from the outer fitting section of the extended arm section is configured by a top half section of the extended arm section.

[Effect of Invention]

With the steering device of the present invention, it is possible to suppress occurrence of looseness in the width direction in a member that is provided around a section of the adjustment rod that protrudes from the outside surface of the support plate sections when the clamping force is released in order to adjust the position of the steering wheel.

BRIEF DESCRIPTION OF DRAWINGS

FIG. 15 (A) (b) illustrates the engaged state of the driving-side cam and the driven-side cam in the locked state; FIG. 15 (B) (a) illustrates the pivotal position of the adjustment lever in an unlocked state; and FIG. 15 (B) (b) illustrates the engaged state of the driving-side cam and the driven-side cam in the unlocked state.

MODES FOR CARRYING OUT INVENTION

First Example

Figure 14:
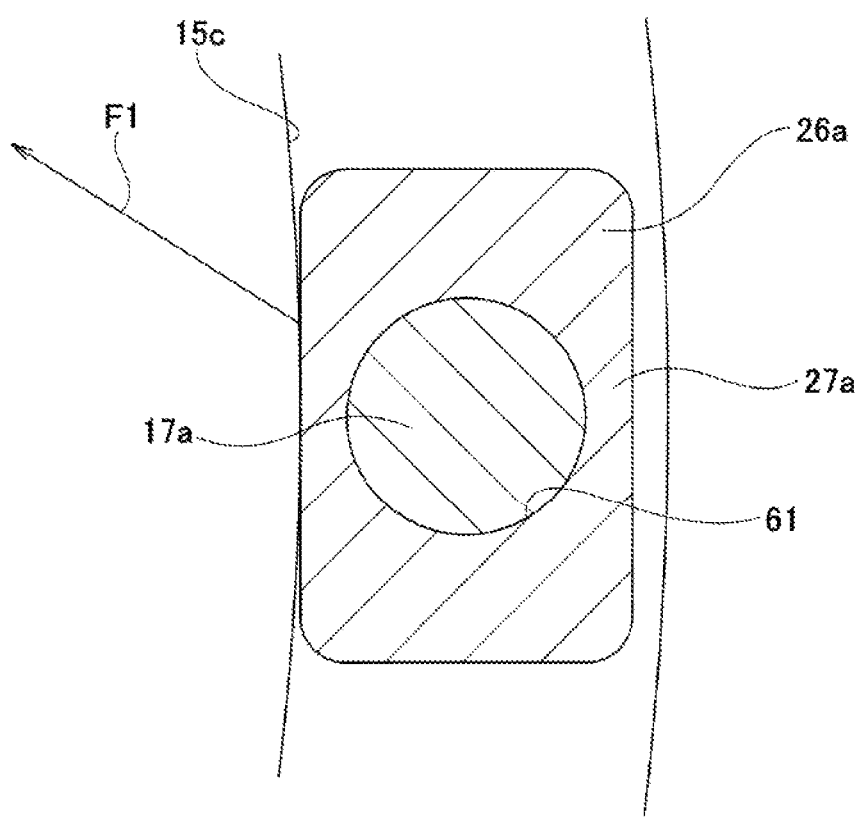
FIG. 14 is a cross-sectional view taken along section line B-B in FIG. 10.
Figure 15:
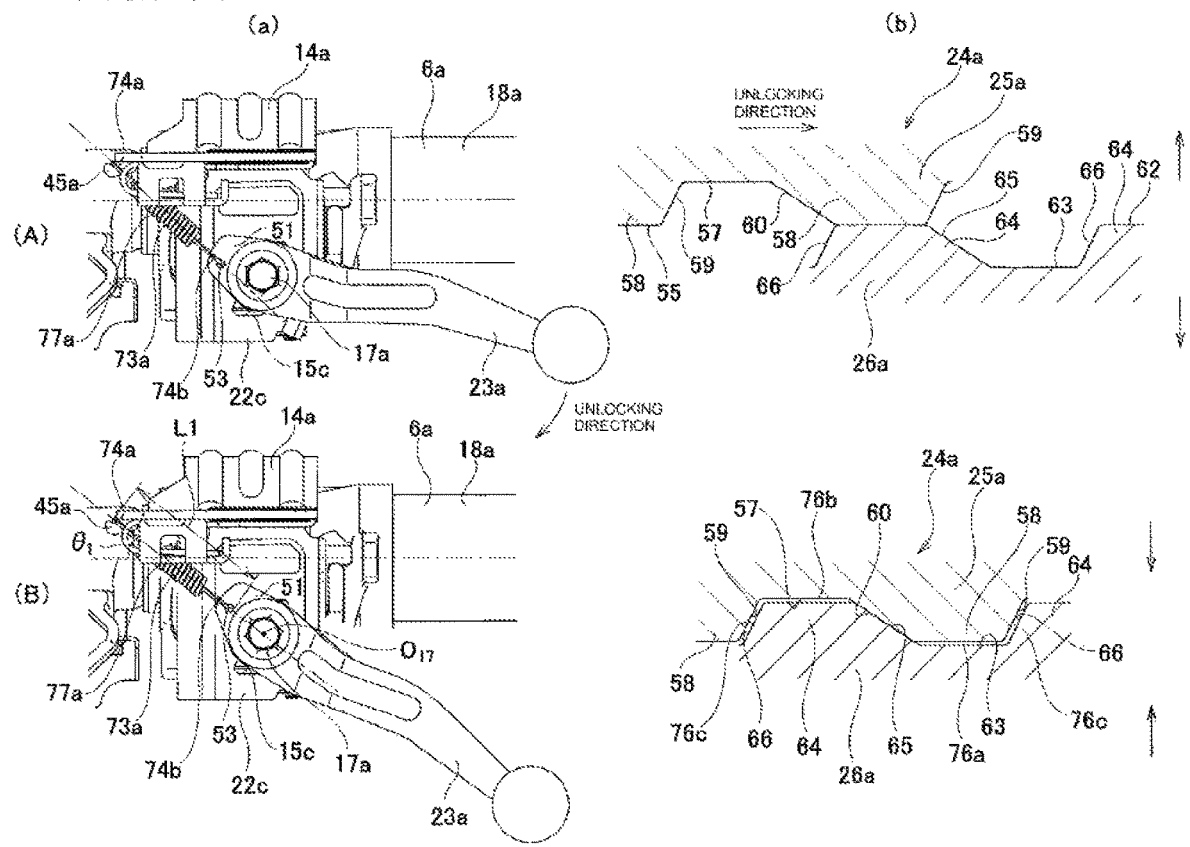
FIG. 15 (A) and FIG. 15 (B) are explanatory views of a relationship between a pivotal position of the adjustment lever and an engaged state of the cam apparatus regarding the steering device of the first example, and FIG. 15 (A) (a) illustrates the pivotal position of the adjustment lever in a locked state.
Figure 23:
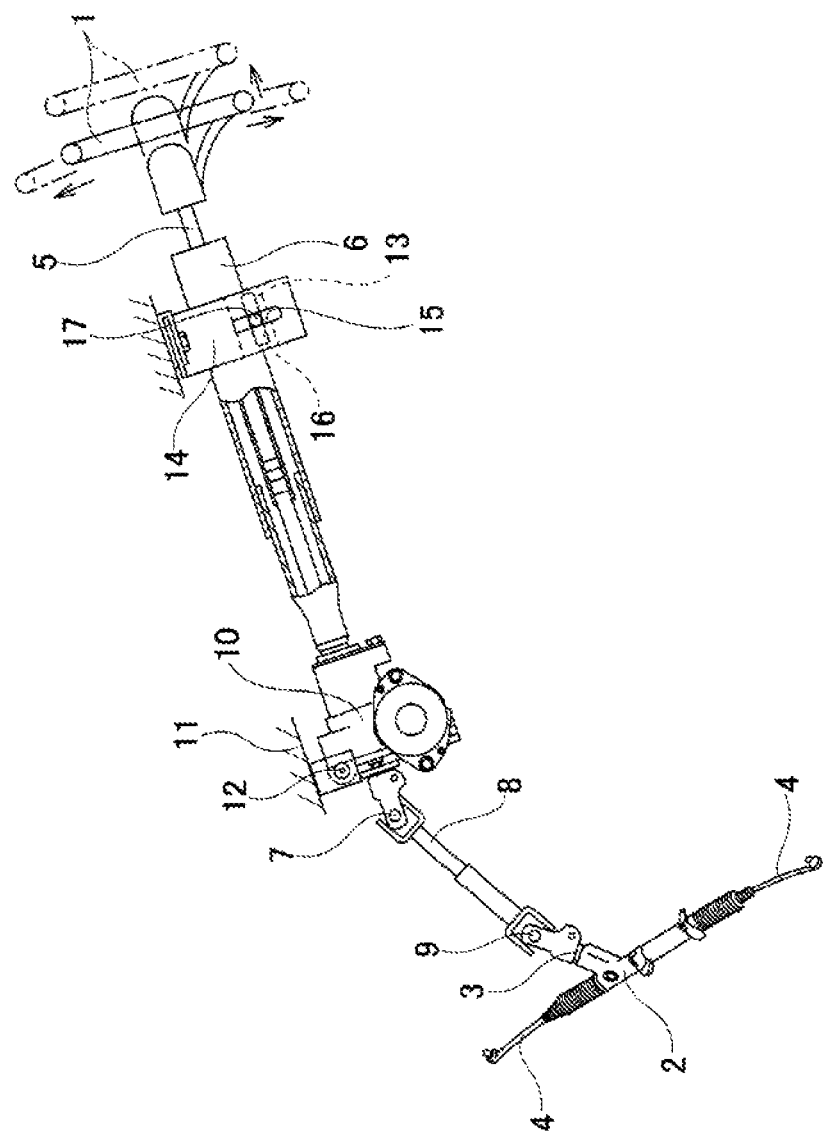
FIG. 23 is a schematic view of an example of a conventional steering device to which the present invention can be applied.
Figure 24:
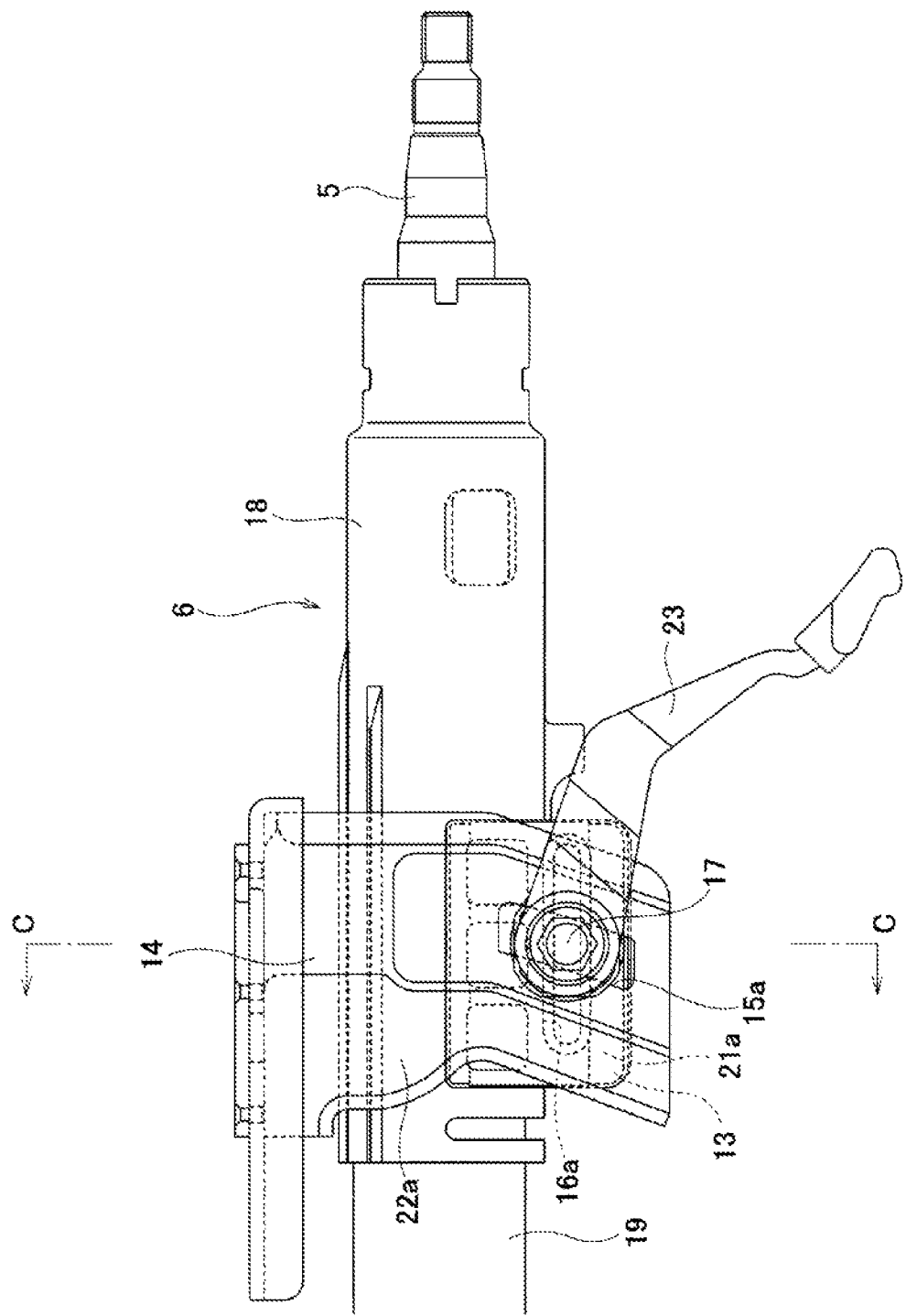
FIG. 24 is a partial side view of an example of a conventional position adjustment device for a steering wheel to which the present invention can be applied.
Figure 25:
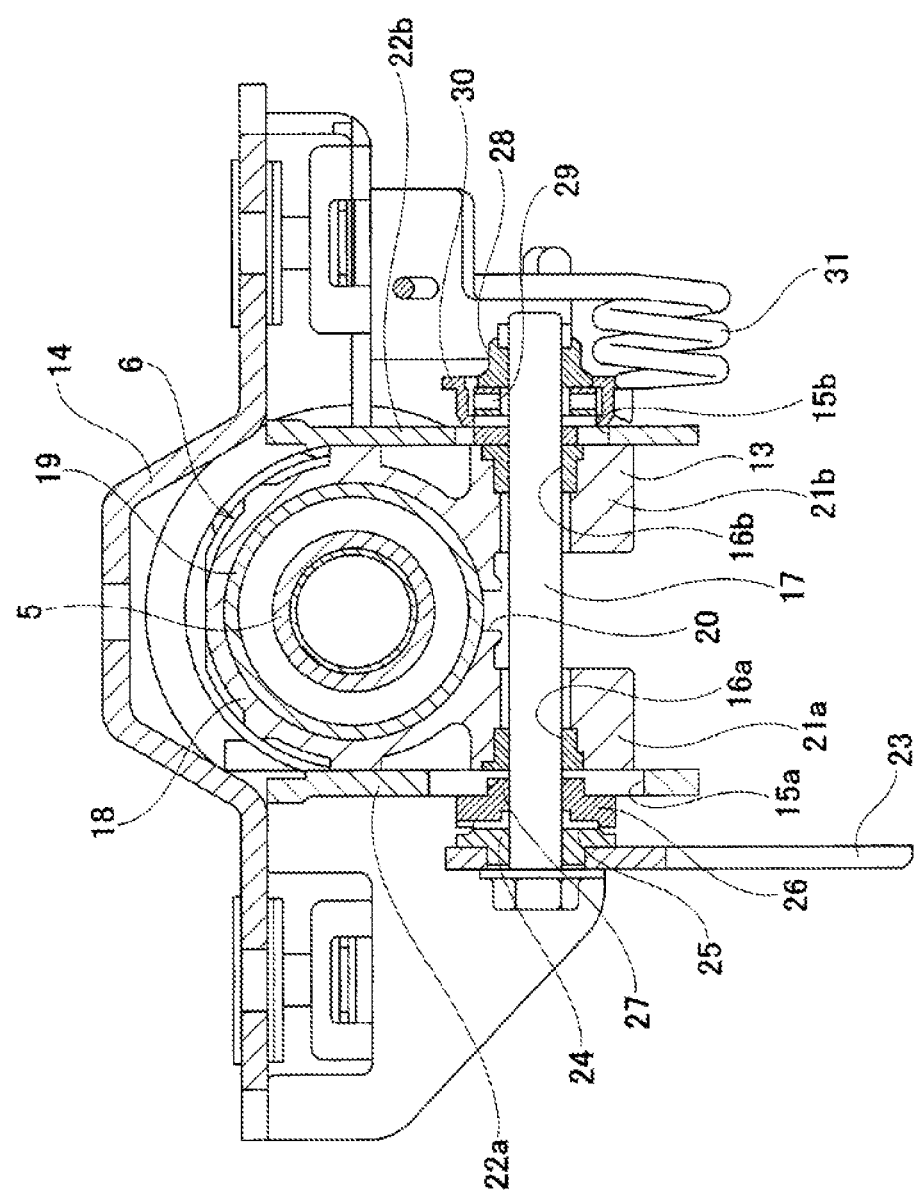
FIG. 25 is a cross-sectional view taken along section line C-C in FIG. 24.

FIG. 1 to FIG. 15 illustrate a first example of an embodiment of the present invention. FIG. 1 to FIG. 10 and FIG. 15 (A) illustrate a state where the adjustment lever 23a is swung to a lock position where the position of the steering wheel 1 (see FIG. 23) is held, and FIG. 15(B) illustrates a state where the adjustment lever 23a is swung to an unlocked position where the position of the steering wheel 1 can be adjusted.

The steering device of the present example comprises a steering shaft 5a which supports the steering wheel 1 at its rear end portion, and a cylindrical steering column 6a which is supported by the vehicle 11 (see FIG. 23) and rotatably supports the steering shaft 5a by way of a plurality of rolling bearings in a state where the steering shaft 5a is inserted therein in the axial direction.

A gear housing 10a of an electric assist device is fastened to the front end portion of the steering column 6a. The gear housing 10a is supported by a lower bracket 32 that can be fastened to the vehicle body 11 so as to be able to pivotally displace around the tilt axis 12a arranged in the width direction. An electric motor (not shown) is supported on the gear housing 10a, and the output torque of this electric motor is applied to the steering shaft 5a by way of a reduction mechanism arranged inside the gear housing 10a. As a result, the force required to operate the steering wheel 1 can be reduced.

The steering device of the present example comprises a telescopic mechanism for adjusting the forward-backward position of the steering wheel 1 and a tilt mechanism for adjusting the up-down position of the steering wheel 1 according to the physique or posture of the driver.

In the steering column 6a, the front section of the outer column 18a arranged on the rear side (upper side) is fitted to the rear section of the inner column 19 arranged on the front side (lower side) so as to be able to relatively displace in the axial direction, so the entire length can be expanded or contracted. The outer column 18a is supported so as to be able to move in the forward-backward direction with respect to the support bracket 14a. The steering shaft 5a has a construction in which an inner shaft 33 and an outer shaft 34 are combined so as to be able to transmit torque and to be able to extend or contract with a spline engagement or the like. The telescopic mechanism is configured by such a construction. However, in a construction where the telescopic mechanism is omitted and only the tilt mechanism is provided, the steering column can be configured by a single cylindrical member.

The tilt mechanism is configured as a result of the steering column 6a and the gear housing 10a being supported by the vehicle body 11 so as to be able to pivotally displace around the tilt axis 12a, and the outer column 18a being supported by the support bracket 14a so as to be able to move in the up-down direction.

Figure 10:
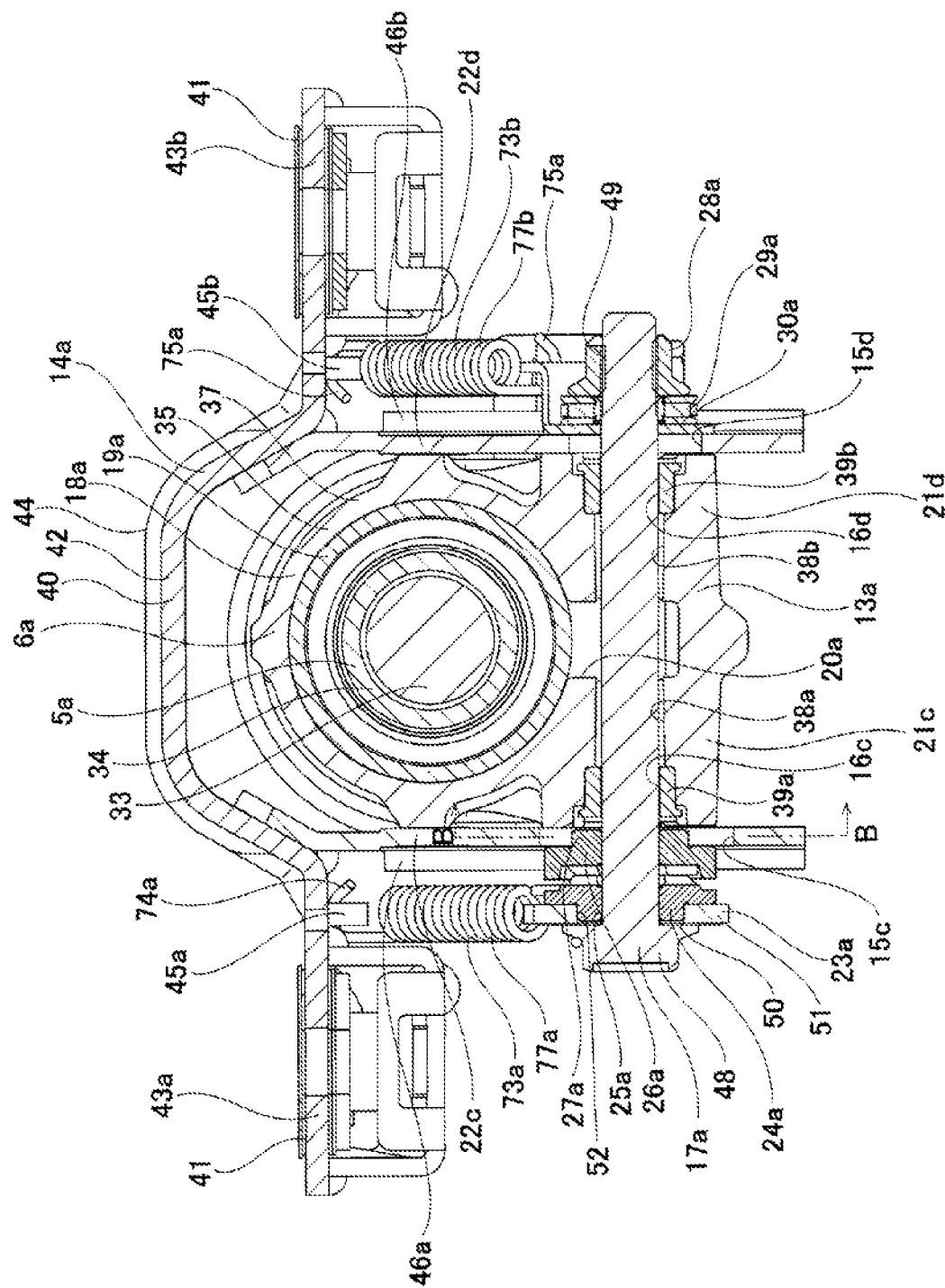
FIG. 10 is a cross-sectional view taken along section line A-A in FIG. 6, and illustrates the steering device of the first example.
Figure 11:
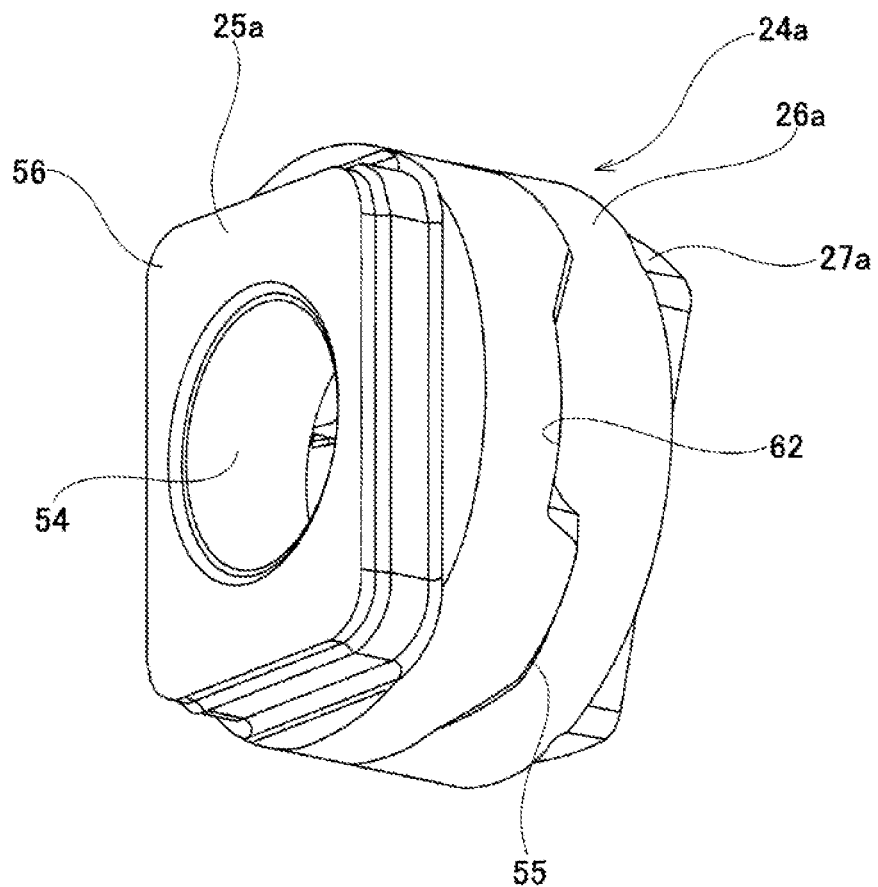
FIG. 11 is a perspective view of a cam apparatus that is incorporated into the steering device of the first example.

The outer column 18a comprises a clamped section 35 which is made of a light alloy such as aluminum alloy and magnesium alloy arranged on its front half section, and a cylindrical section 36 which is made of ferrous alloy such as carbon steel arranged on its rear half section and joined to the clamped section 35 in the axial direction. The clamped section 35 is supported by the support bracket 14a so as to be able to move in the forward-backward direction and the up-down direction. Specifically, the clamped section 35 of the outer column 18a comprises a column fitting section 37 in its upper half section and a displacement bracket 13a in its lower half section. As illustrated in FIG. 10, the column fitting section 37 is fitted around the rear section of the inner column 19a and comprises a slit 20a at its lower end section that extends in the axial direction. In the present example, the displacement bracket 13a comprises a pair of clamped plate sections 21c, 21d, which are arranged on both sides in the width direction of the slit 20a, on the lower side of the column fitting section 37. The lower end sections of the pair of clamped plate sections 21c, 21d are connected in the width direction. In the present example, the front half section of the outer column 18a corresponds to part of the steering column 6a.

The pair of clamped plate sections 21c, 21d comprises long holes 16c, 16d (long holes for telescopic adjustment) in the forward-backward direction that pass through its width direction and extend in the forward-backward direction, the long holes 16c, 16d in the forward-backward direction corresponding to column side through holes. In the illustrated example, the long holes 16c, 16d in the forward-backward direction are configured by lower holes 38a, 38b that are formed in the pair of clamped plate sections 21c, 21d and the inner surfaces of long cylindrical sleeves 39a, 39b made of synthetic resin that are mounted inside the outer half section in the width direction of the lower holes 38a, 38b. The sleeves 39a, 39b are made of synthetic resin such as polyamide resin, polyacetal resin, polytetrafluoroethylene resin having excellent slidability. However, in a construction in which the telescopic mechanism is omitted and only the tilt mechanism is provided, the column side through holes can be configured by simple circular holes.

The support bracket 14a is made of a metal plate having sufficient rigidity such as steel or aluminum alloy, and has an installation plate section 40, a pair of support plate sections 22c, 22d that are coupled to the installation plate section 40 and are arranged on both sides in the width direction of the displacement bracket 13a, and a pair of long holes in the up-down directions 15c, 15d (long holes for tilt adjustment) that extend in the up-down direction and provided in the pair of support plate sections 22c, 22d.

The installation plate section 40 is locked to the locking capsules 41 that are fastened to the vehicle body so as to be able to break away in the forward direction. The installation plate section 40 is normally supported by the vehicle body 11 by way of the locking capsules 41, however, during a collision accident, the installation plate breaks away in the forward direction from the locking capsules 41 due to the impact of a secondary collision, and the displacement of the outer column 18a in the forward direction is allowed.

The installation plate section 40 comprises a bridge section 42 that is arranged in the center section in the width direction and a pair of side plate sections 43a, 43b that are arranged in both side sections in the width direction. The bridge section 42 has an inverted U-shaped cross section and is located above the clamped section 35 of the outer column 18a. The bridge section 42 comprises a plurality of (three in the illustrated example) ribs 44 that are arranged to be separated in the forward-backward direction so as to maintain rigidity. Each of the pair of side plate sections 43a, 43b has a flat plate shape and comprises a locking notch that is open at the edge on the rear end for locking the locking capsule 41. Each of the pair of side plate sections 43a, 43b comprises approximate L-shaped locking arm portions 45a, 45b at the inner end portion in the width direction of its front end portion. The locking arm portions 45a, 45b respectively have a shape that they are bent downward at substantially right angles from the inner end portion in the width direction of the front end portion of each of the pair of side plate sections 43a, 43b and protrude toward the forward direction from the lower end portion thereof. The shape and the formation positions of the locking arm portions 45a, 45b are preferably symmetrical with respect to the width direction.

The upper end portions of the pair of support plate sections 22c, 22d are fastened to both end portions in the width direction of the lower surface of the bridge section 42. The pair of support plate sections 22c, 22d are arranged on both sides in the width direction of the clamped section 35 of the outer column 18a so as to be substantially parallel to each other. In the present example, the pair of support plate sections 22c, 22d comprises the pair of long holes 15c, 15d in the up-down direction that extends in the up-down direction in the shape of a partial arc centered on the tilt axis 12a. Further, the pair of support plate sections 22c, 22d are provided at their front end potions with reinforcing protrusions 46a, 46b that extend in the up-down direction. The upper end portions of the reinforcing protrusions 46a, 46b are not connected to the bridge section 42. In the present example, as tension springs 73a, 73b are arranged on both outer sides in the width direction of the pair of support plate sections 22c, 22d, in order to secure the cross-sectional modulus and suppress the amount of protrusion toward outside in the width direction, the reinforcing protrusions 46a, 46b have a circular arc-shaped cross section in which the front end portions are folded back toward inside in the width direction. The pair of support plate sections 22c, 22d are provided at their rear end portions with bent plate sections 47a, 47b that extend in the up-down direction and are bent at a substantially right angle toward outside in the width direction. The reinforcing protrusions 46a, 46b and the bent plate sections 47a, 47b are provided in order to increase the bending rigidity (torsional strength) of the support plate sections 22c, 22d. The shape of the long holes in the up-down direction is not only limited to the partial arc centered on the tilt axis, and alternatively, it is possible to employ a straight shape that extend in the backward direction as it goes upward.

As illustrated in FIG. 10, the adjustment rod 17a is arranged so as to be inserted into the pair of long holes 16c, 16d in the forward-backward direction and the pair of long holes 15c, 15d in the up-down direction in the width direction. The adjustment rod 17a comprises a head portion 48 on its one end section and a male screw section 49 on the other end section. On one end side of the adjustment rod 17a, a disc spring 50, an adjustment lever 23a, and a cam apparatus 24a are provided in this order from the outside in the width direction around the section protruding from the outside surface of one support plate section 22c of the pair of support plate sections 22c, 22d, that is, between the head portion 48 and the outside surface of one support plate section 22c. On the other end side of the adjustment rod 17a, a nut 28a, a thrust bearing 29a, and a pressing plate 30a are provided in this order from the outside in the width direction around the section protruding from the outside surface of the other support plate section 22d of the pair of support plate sections 22c, 22d. The nut 28a is screwed onto the male screw section 49 of the other end section of the adjustment rod 17a. Since the head portion 48 and the nut 28a that are arranged on both end portions of the adjustment rod 17a cannot be relatively displaced in the axial direction of the adjustment rod 17a, they function as displacement restricting sections that prevent the members arranged inside in the width direction of the head portion 48 and the nut 28a from displacing outward in the width direction.

In the structure of the present example, the expansion and contraction mechanism is configured by the adjustment lever 23a and the cam apparatus 24a. By swinging the adjustment lever 23a to expand or contract the dimension in the width direction of the cam apparatus 24a, it is possible to expand or contract the space between the driven-side cam 26a and the pressing plate 30a corresponding to a pair of pressing sections and the space between the inside surfaces of the pair of support plate sections 22c, 22d. With this expansion and contraction mechanism, the magnitude of the clamping force in which the support bracket 14a holds the displacement bracket 13a from both sides in the width direction can be adjusted.

The adjustment lever 23a is a member for rocking when the driver adjusts the position of the steering wheel 1. The adjustment lever 23a is made of a metal plate such as a steel plate or a stainless steel plate, and has an elongated shape bent in a substantially crank shape. In the present example, the adjustment lever 23a is arranged so as to extend to the rear side (toward the driver's seat) and downward toward the tip-end side. The adjustment lever 23a comprises a flat-plate shaped base section 51 at its frond end side section (upper end side section). The base section 51 comprises a generally rectangular installation hole 52 that passes through in the plate thickness direction. The base section 51 comprises a circular spring locking hole 53 in a section that is located in front of the installation hole 52. The adjustment lever 23a is fastened to the driving-side cam 25a so as not to be able to relatively rotate by using the installation hole 52. Therefore, the driving-side cam 25a can rotate relative to the driven-side cam 26a by swinging the adjustment lever 23a. In the present example, in a state illustrated in FIG. 15 (A) (a) where the adjustment lever 23a is swung upward, the cam apparatus 24a is in the locked state, and in a state illustrated in FIG. 15 (B) (a) where the adjustment lever 23a is swung downward, the cam apparatus 24a is in the unlocked state.

In the present example, the cam apparatus 24a is configured by a combination of the driving-side cam 25a and the driven-side cam 26a. The driving-side cam 25a is arranged on the outside in the width direction and the driven-side cam 26a is arranged on the inside in the width direction. However, in a configuration where the telescopic mechanism is omitted and only the tilt mechanism is provided, the driving-side cam 25a may be arranged on the inside in the width direction and the driven-side cam may be arranged on the outside in the width direction. In this arrangement, the driving-side cam 25a constitutes the expansion and contraction mechanism. In this case, the width direction is reversed in the following description.

Figure 12:
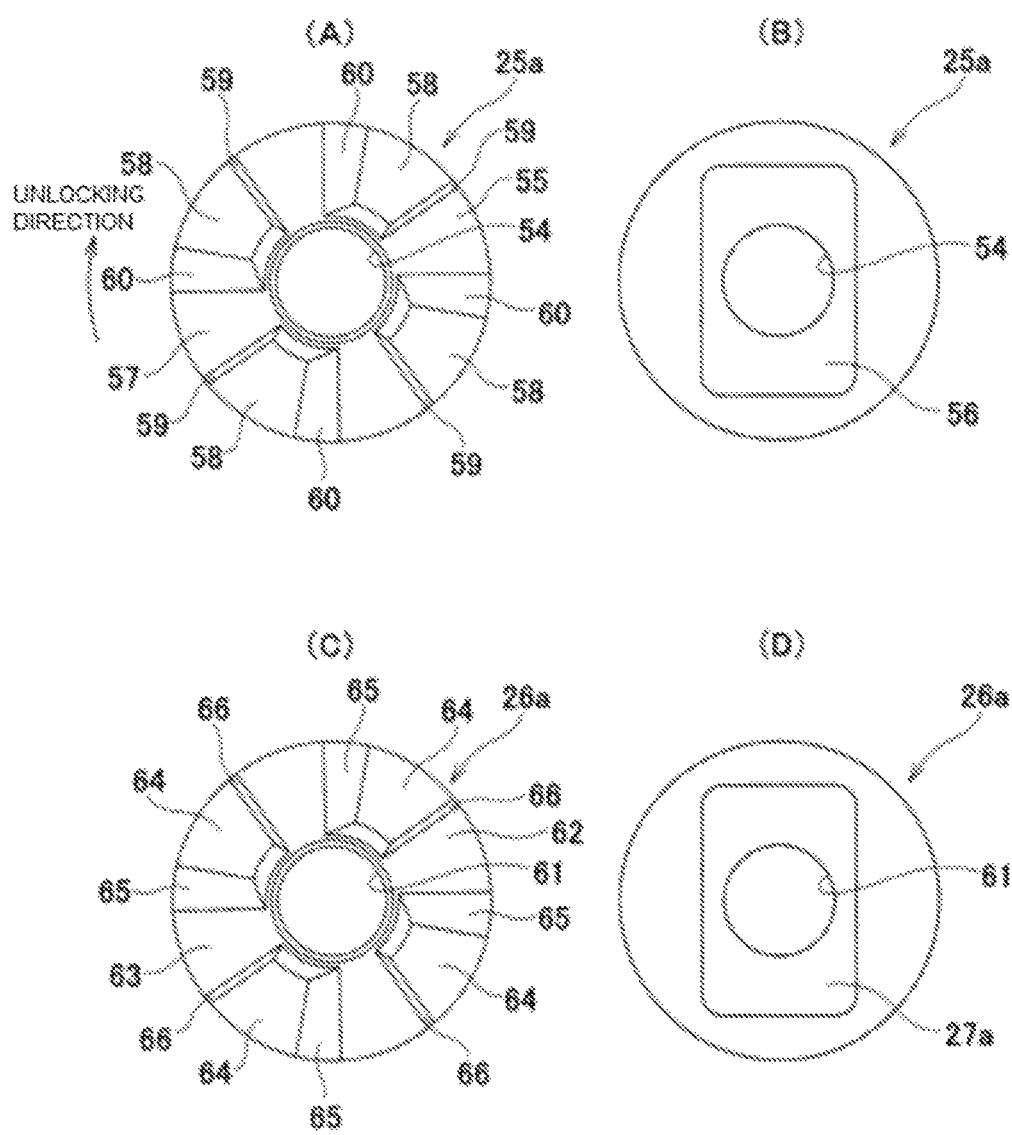
FIG. 12 (A) to FIG. 12 (D) schematically illustrate a driving-side cam and a driven-side cam of the cam apparatus that is incorporated into the steering device of the first example, and FIG. 12 (A) is a front view of the driving-side cam, FIG. 12 (B) is a rear view of the driving-side cam, FIG. 12 (C) is a front view of the driven-side cam, and FIG. 12 (D) is a rear view of the driven-side cam.

The driving-side cam 25a is made of sintered metal, and has an annular plate shape as a whole, and comprises a center hole 54 for inserting the adjustment rod 17a. As illustrated in FIG. 12 (A), the driving-side cam 25a has an inside surface which corresponds to one side surface in the width direction and an outside surface which corresponds to the other side surface in the width direction. The driving-side cam 25a has a driving-side cam surface 55, which is a concave and convex surface in relation to the circumferential direction, on the inside surface. As illustrated in FIG. 12 (B), the driving-side cam 25a comprises an engaging convex section 56 on the outside surface, which has a generally rectangular shape as seen from the front and is provided for fitting and fastening the base section 51 of the adjustment lever 23a thereto.

The driving-side cam surface 55 has a flat driving-side basal surface 57 and driving-side convex sections 58 having a generally trapezoidal cross section that protrude inward in the width direction, which corresponds to one side in the width direction, from a plurality of locations that are equally spaced in the circumferential direction (four locations in the illustrated example) of the driving-side basal surface 57. Of the both side surfaces in the circumferential direction of the driving-side convex sections 58, driving-side stopper surfaces 59 are provided on the forward direction side in relation to the unlocking direction which is the direction of rotation of the driving-side cam 25a when switching to the unlocked state, and driving-side guide inclined surfaces 60 are provided on its rear side. The driving-side guide inclined surfaces 60 and the driving-side stopper surfaces 59 have opposite inclination directions in the circumferential direction, and the driving-side stopper surfaces 59 have a larger inclination angle with respect to the driving-side basal surface 57 compared to the driving-side guide inclined surfaces 60. In the present example, the driving-side stopper surfaces 59 are not substantially used.

By the non-circular fitting of the installation hole 52 of the base section 51 of the adjustment lever 23a to the engaging convex section 56 of the driving-side cam 25a, the driving-side cam 25a is fastened to the base section 51 of the adjustment lever 23a so as to be able to be reciprocally rotated along with the reciprocating swing of the adjustment lever 23a. By the adjustment lever 23a and the adjustment rod 17a engage so as not to rotate relative to each other by a concave and convex fitting or the like (not shown), the driving-side cam 25a can rotate in synchronization with the adjustment rod 17a. However, it is also possible to employ a construction where the driving-side cam is externally fitted onto the adjustment rod so as to be able to relatively rotate. In this case, the driving-side cam rotates by swinging the adjustment lever, but the adjustment rod does not rotate.

Similar to the driving-side cam 25a, the driven-side cam 26a is made of sintered metal, has an annular plate shape as a whole, and comprises a center hole 61 for inserting the adjustment rod 17a. As illustrated in FIG. 12 (C), the driven-side cam 26a has an inside surface which corresponds to one side surface in the width direction and an outside surface which corresponds to the other side surface in the width direction. The driven-side cam 26a comprises a driven-side cam surface 62, which is a concave and convex surface in the circumferential direction, on the outside surface. As illustrated in FIG. 12 (D), the driven-side cam 26a comprises an engaging convex section 27a that has a generally rectangular-plate shape and protrudes inward in the width direction on the inside surface.

The driven-side cam surface 62 has a flat driven-side basal surface 63, and has driven-side convex sections 64 that are the same as the number of driving-side convex sections 58 and have a generally trapezoidal cross section that protrudes outward in the width direction, which corresponds to the other side in the width direction, from a plurality of locations that are equally spaced in the circumferential direction of the driven-side basal surface 63. Driven-side guide inclined surfaces 65 are provided on the forward direction side in the unlocking direction of both side surfaces in the circumferential direction of the driven-side convex sections 64, and driven-side stopper surfaces 66 are provided on the rear side thereof. The driven-side guide inclined surfaces 65 and the driven-side stopper surfaces 66 have opposite inclination directions with respect to the circumferential direction, and the inclination angle of the driven-side stopper surfaces 66 with respect to the driven-side basal surface 63 is larger than that of the driven-side guide inclined surfaces 65. In the present example, the substantially driven-side stopper surfaces 66 are not used.

The driven-side cam 26a is externally fitted onto the adjustment rod 17a so as to be able to relatively rotate with respect to the adjustment rod 17a and to relatively displace in the axial direction of the adjustment rod 17a. The engaging convex section 27a engages with the long hole 15c in the up-down direction of the one support plate section 22c so as to be able to displace only along the long hole 15c in the up-down direction. Therefore, the driven-side cam 26a can move in the up or down direction along the long hole 15c in the up-down direction, but it does not rotate largely except for a slight rotation caused by the gap existing between the forward-backward direction side edge of the long hole 15c in the up-down direction and the forward-backward direction side surface of the engaging convex section 27a.

When adjusting the position of the steering wheel 1, the adjustment lever 23a is swung from the lock position illustrated in FIG. 15 (A) (a) to the unlocked position illustrated in FIG. 15 (B) (a). Due to this, as illustrated in FIG. 15 (A) (b), the driving-side cam 25a rotates in the unlocking direction, and as illustrated in FIG. 15 (B) (b), the driving-side convex sections 58 and the driven-side convex sections 64 are alternately arranged in the circumferential direction to be in the unlocked state. The dimension in the width direction of the cam apparatus 24a of the expansion and contraction device contracts and the space between the driven-side cam 26a and the pressing plate 30a of the pair of pressing sections expands. As a result, the surface pressure of the area of contact between the inside surfaces of the support plate sections 22c, 22d and the outside surfaces of the clamped plate sections 21c, 21d is either reduced or lost, and at the same time, the inner diameter of the column fitting section 37 of the outer column 18 is elastically increased so that the surface pressure of the area of contact between the inner circumferential surface of the column fitting section 37 and the outer circumferential surface of the rear section of the inner column 19 is reduced. In this unclamping state, the up-down position and the forward-backward position of the steering wheel 1 can be adjusted in a range where the adjustment rod 17a can move inside the pair of long holes 15c, 15d in the up-down direction and the pair of long holes 16c, 16d in the forward-backward direction.

In order to keep the steering wheel 1 in a desired position, after moving the steering wheel 1 to the desired position, the adjustment lever 23a is swung upward from the state illustrated in FIG. 15 (B) (a) so as to rotate the driving-side cam 25a to the locking direction. As illustrated in FIG. 15 (A) (b), the tip-end surfaces of the driving-side convex sections 58 and the tip-end surfaces of the driven-side convex sections 64 are in a state of butting each other (locked state), and the dimension in the width direction of the cam apparatus 24a of the expansion and contraction device expands and the space between the driven-side cam 26a and the pressing plate 30a of the pair of pressing sections (the space between the inside surfaces of the pair of support plate sections 22c, 22d) contracts. As a result, the surface pressure of the area of contact between the inside surfaces of the support plate sections 22c, 22d and the outside surfaces of the clamped plate sections 21c, 21d increases, and at the same time, the inner diameter of the column fitting section 37 elastically contracts so that the surface pressure of the area of contact between the inner circumferential surface of the column fitting section 37 and the outer circumferential surface of the rear section of the inner column 19 increases. In this clamping state, the steering wheel 1 is kept in a position after adjustment.

The disc spring 50 is made of steel such as carbon steel, carbon tool steel, and spring steel, and has a cylindrical shape, and is externally fitted onto a section near the one end of the adjustment rod 17a so as to be held between the inside surface of the head portion 48 of the adjustment rod 17a and the outside surface of the base section 51 of the adjustment lever 23a. The disc spring 50 applies elasticity to the inside surface of the head portion 48 and the outside surface of the base section 51 in directions away from each other. Due to this, even when the clamping force is released in order to adjust the position of the steering wheel 1, it is possible to suppress occurrence of looseness in the width direction in the cam apparatus 24a between the inside surface of the head portion 48 and the outside surface of one support plate section 22c, and it is possible to suppress occurrence of looseness in the width direction in the thrust bearing 29a and the pressing plate 30a between the inside surface of the nut 28a and the outside surface of the other support plate section 22d. In the present example, as it is possible to suppress occurrence of looseness in the width direction in the cam apparatus 24a and the thrust bearing 29a by using a moment that is applied to the pressing plate 30a, the disc spring 50 can be omitted.

Figure 13:
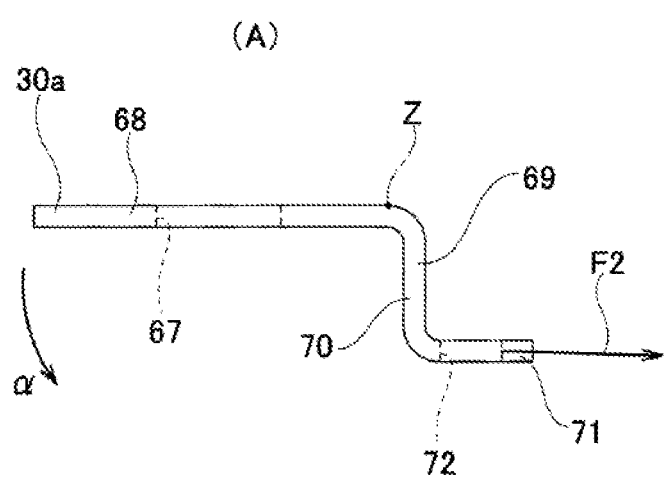
FIG. 13 (A) and FIG. 13 (B) illustrate a pressing plate that is incorporated into the steering device of the first example, and FIG. 13 (A) is a top view of the pressing plate, and FIG. 13 (B) is a front view of the pressing plate.
Figure 13:
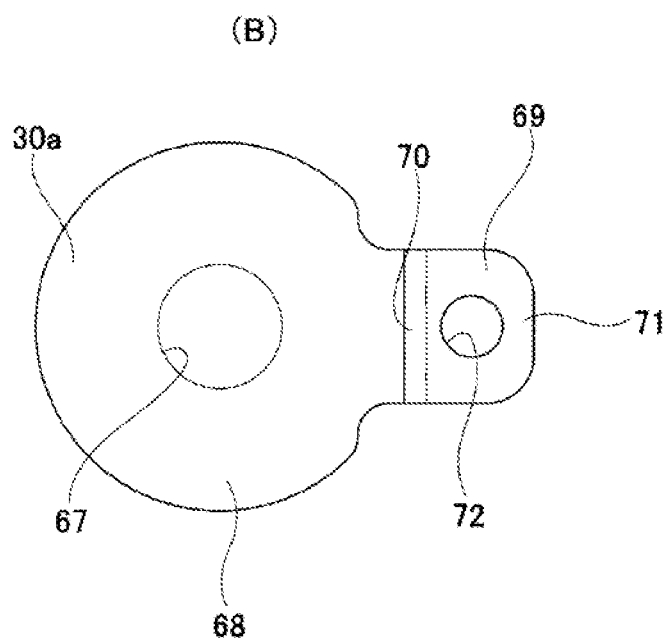

As illustrated in FIG. 13, the pressing plate 30a of the pair of pressing sections is made of a metal plate such as a cold rolled steel plate (SPCC) and a hot rolled steel plate (SPHC), and has a crank shape as a whole. The pressing plate 30a is externally fitted on to a section near the other end of the adjustment rod 17a so as to be able to relatively rotate with respect to the adjustment rod 17a and to relatively displace in the axial direction of the adjustment rod 17a. The pressing plate 30a comprises a cylindrical plate body 68 that has an insertion hole 67 for inserting the adjustment rod 17a and is externally fitted onto the adjustment rod 17a, the cylindrical plate body 68 corresponding to an outer fitting section, and an approximate L-shaped locking plate section 69 that is located in one place on the outer circumferential edge of the plate body 68, the locking plate section 69 corresponding to an extended arm section. The base half section 70 of the locking plate section 69 has a flat plate shape and extends toward outside in the width direction (the axial direction of the plate body 68) from the outer circumferential edge of the plate body 68, that is, the base half section 70 of the locking plate section 69 is arranged at a right angle to the plate body 68. The top half section 71 of the locking plate section 69 has a flat plate shape and extends from the outer end section (tip end section) in the width direction of the base half section 70 toward the side opposite to the plate body 68 so as to be bent at a substantially right angle. The plate body 68 is arranged between the outside surface of the other support plate section 22d and the inside surface of the thrust bearing 29a. The top half section 71 of the locking plate section 69 comprises a circular spring locking hole 72. The locking plate section 69 corresponds to the extended arm section, and the top half section 71 corresponds to a section shifted in the width direction from the plate body 68, the plate body 68 corresponding to the outer fitting section of the locking plate section 69. In the present example, the distance from the center of rotation (center axis) of the adjustment rod 17a to the spring locking hole 72 is the same as the distance from the center of rotation of the adjustment rod 17a to the spring locking hole 53 which is provided in the base section 51 of the adjustment lever 23a. The plate body 68 and the top half section 71 of the locking plate section 69 are arranged so as to be parallel to each other, and the base half section 70 of the locking plate section 69 is arranged at a right angle to the plate body 68 and the top half section 71 of the locking plate section 69. In the present example, the pressing plate 30a corresponds to the locked member.

The thrust bearing 29a has a pair of bearing rings having an annular plate shape and a plurality of needles that are radially arranged between the pair of bearing rings. The thrust bearing 29a supports the thrust load acting on the pressing plate 30a from the nut 28a, and enables the nut 28a to reciprocally swing.

Figure 1:
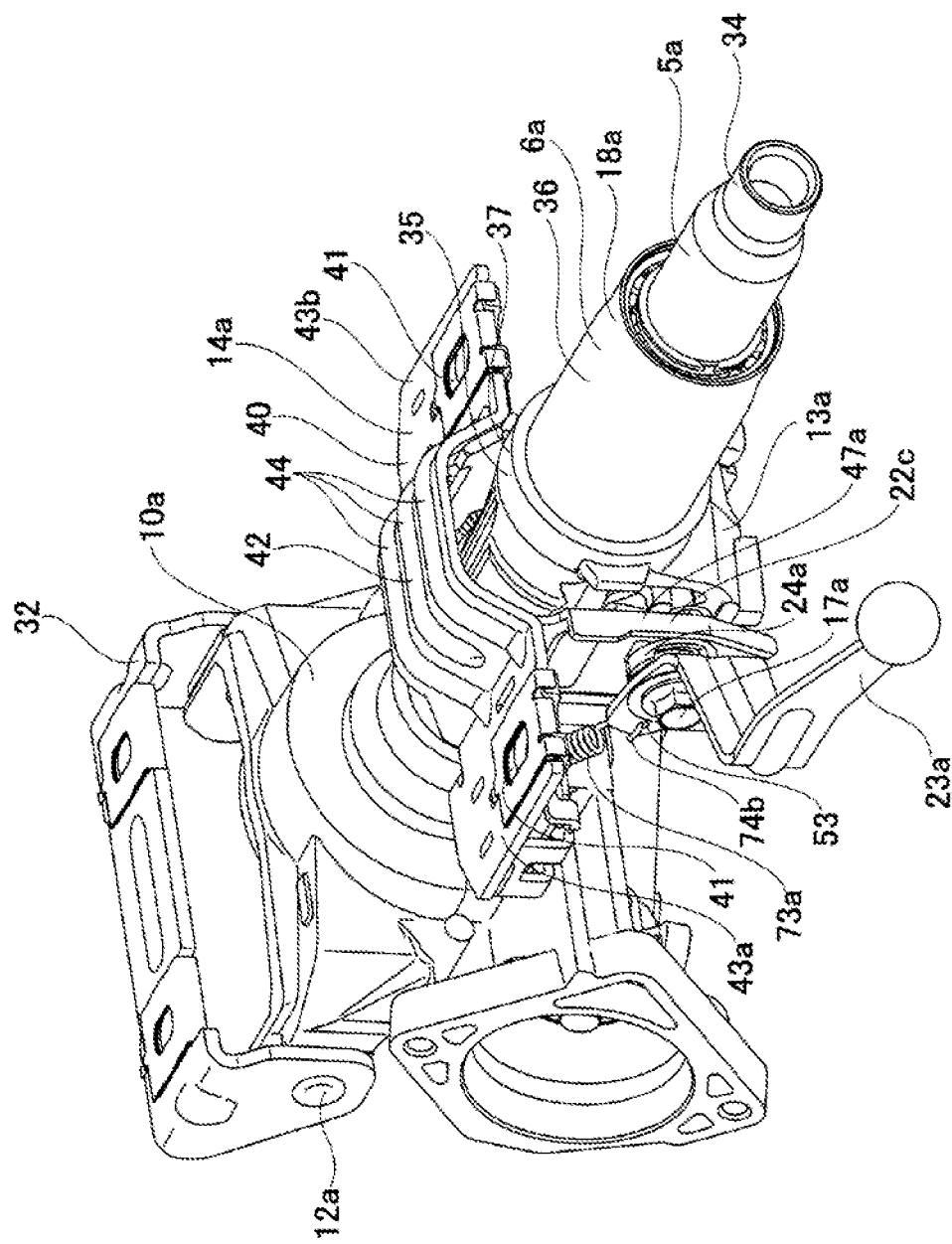
FIG. 1 is a perspective view of a steering device of a first example of an embodiment of the present invention as seem from a rear side and an upper side on the adjustment lever side.
Figure 2:
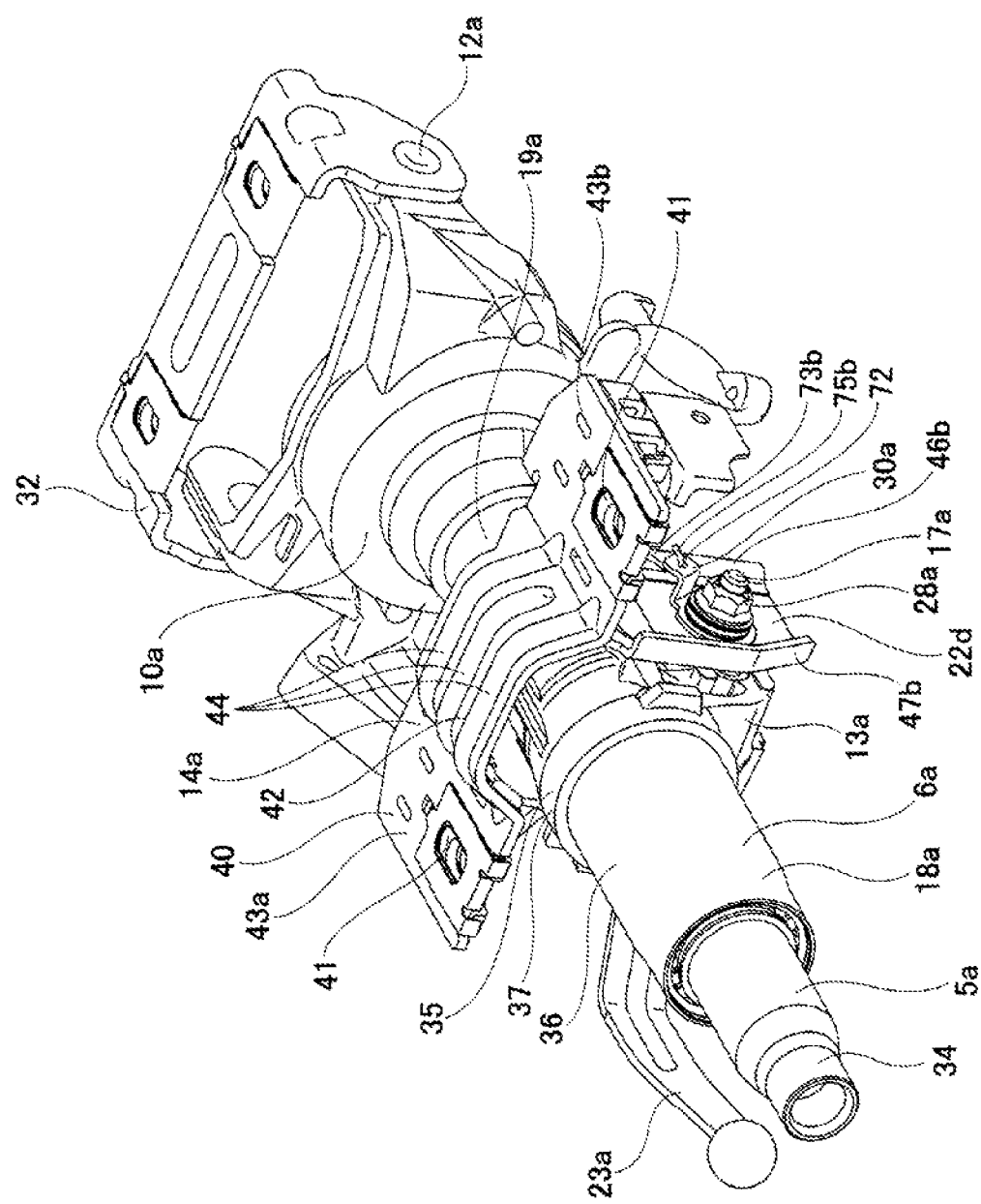
FIG. 2 is a perspective view of the steering device of the first example as seen from the rear side and the upper side on a side opposite to the adjustment lever.
Figure 3:
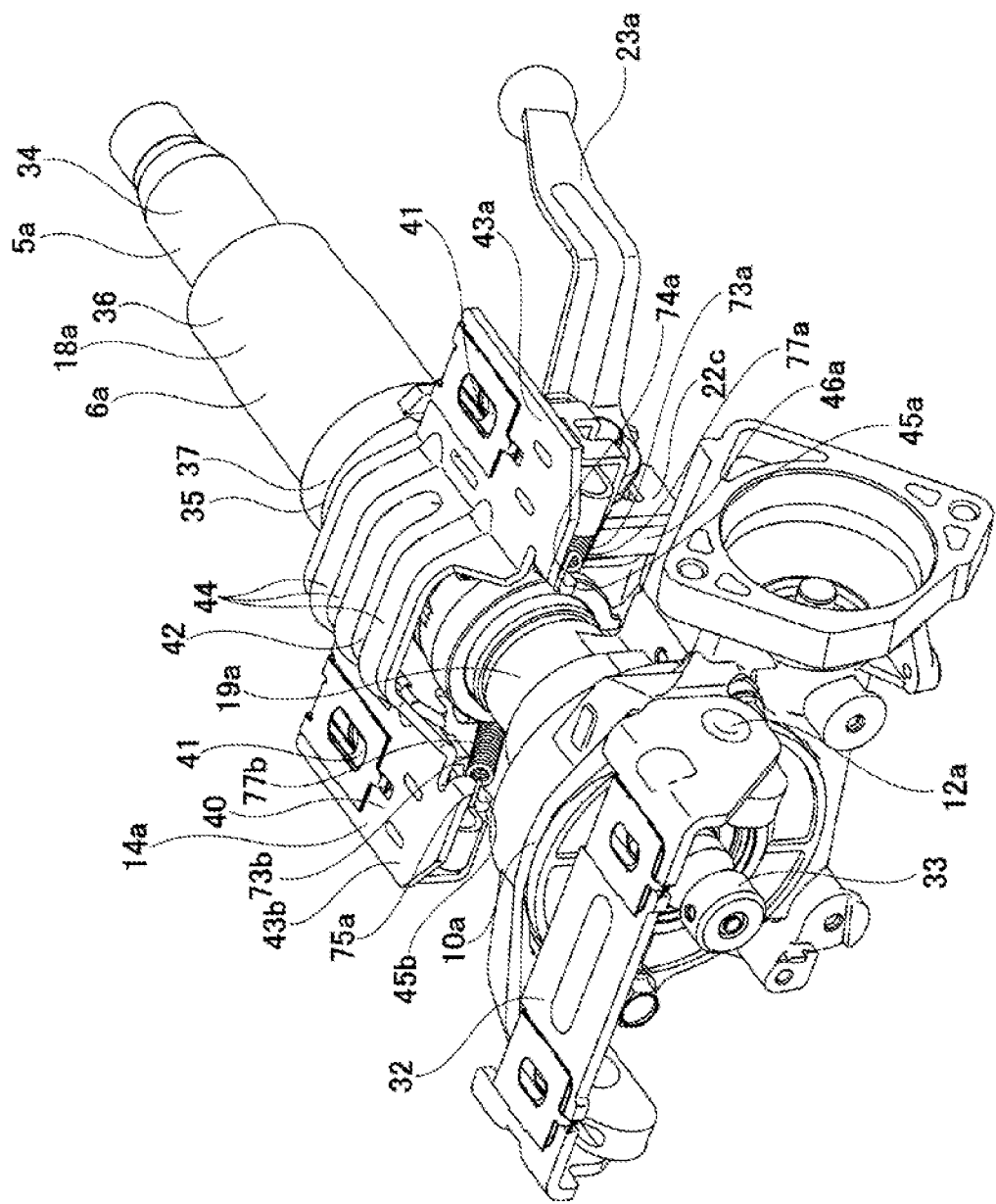
FIG. 3 is a perspective view of the steering device of the first example as seen from a front side and the upper side on the adjustment lever side.
Figure 4:
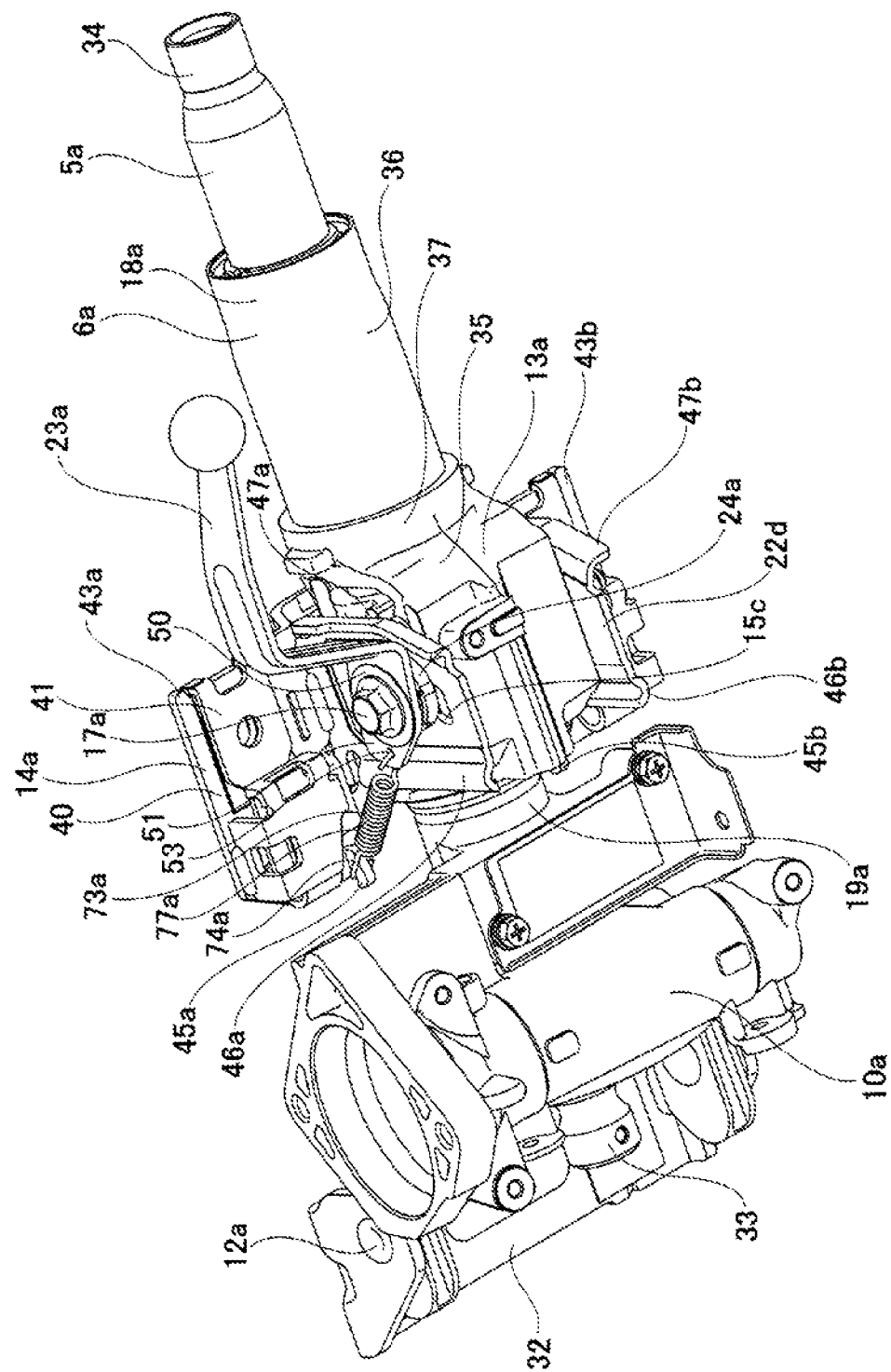
FIG. 4 is a perspective view of the steering device as seen from the rear side and a lower side on the adjustment lever side.
Figure 5:
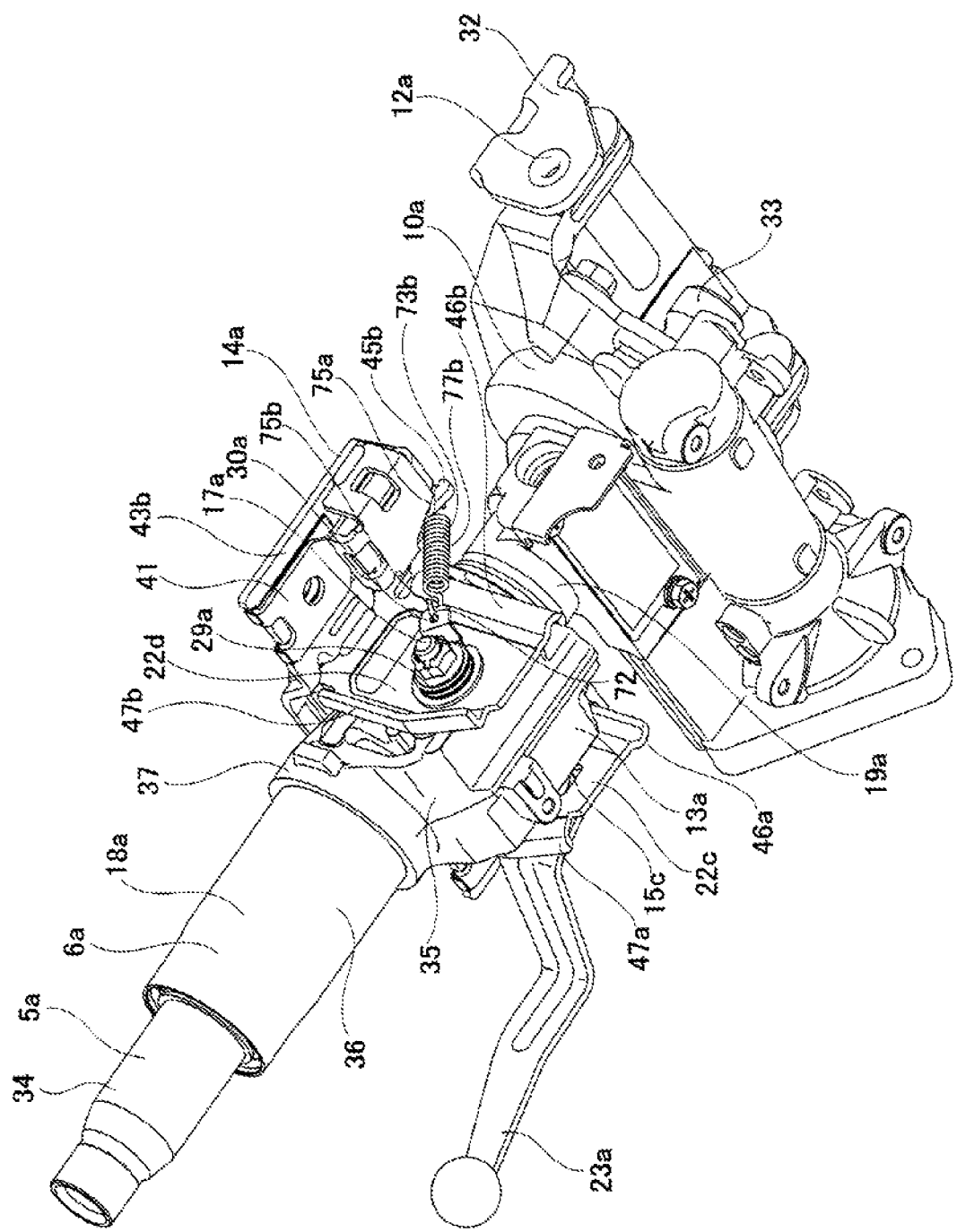
FIG. 5 is a perspective view of the steering device as seen from the rear side and the lower side on the side opposite to the adjustment lever.
Figure 6:
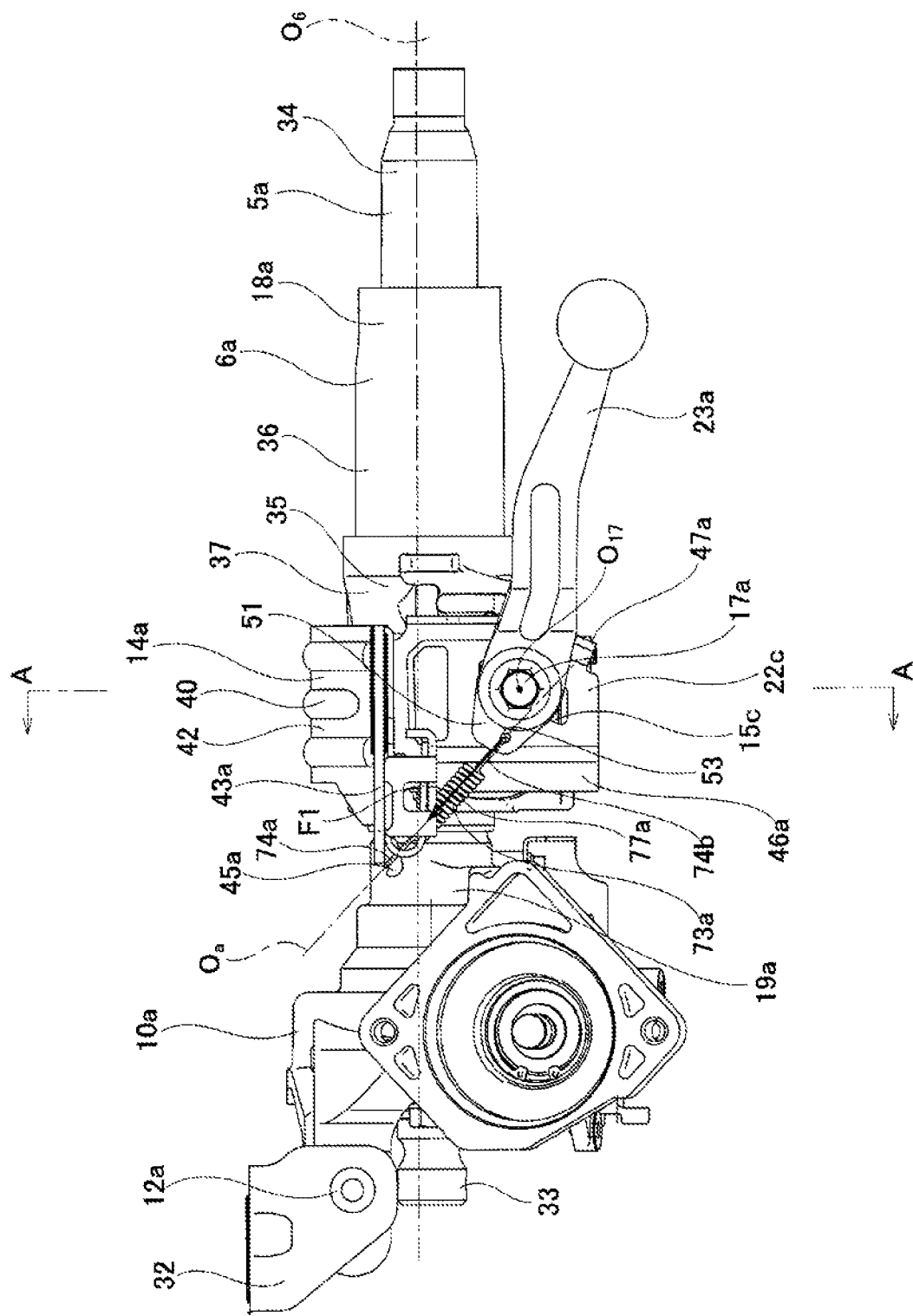
FIG. 6 is a side view of the steering device of the first example as seen from the adjustment lever side.
Figure 7:
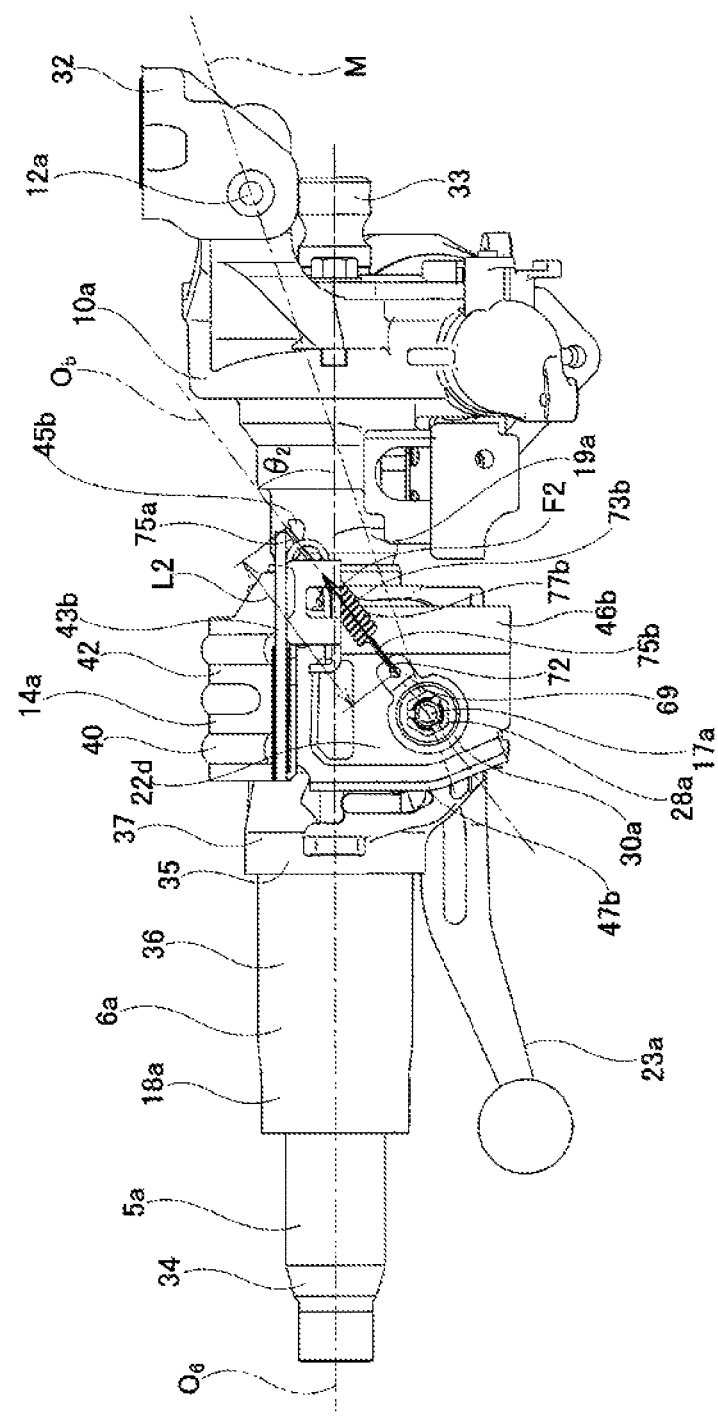
FIG. 7 is a side view of the steering device of the first example as seen from the side opposite to the adjustment lever.
Figure 8:
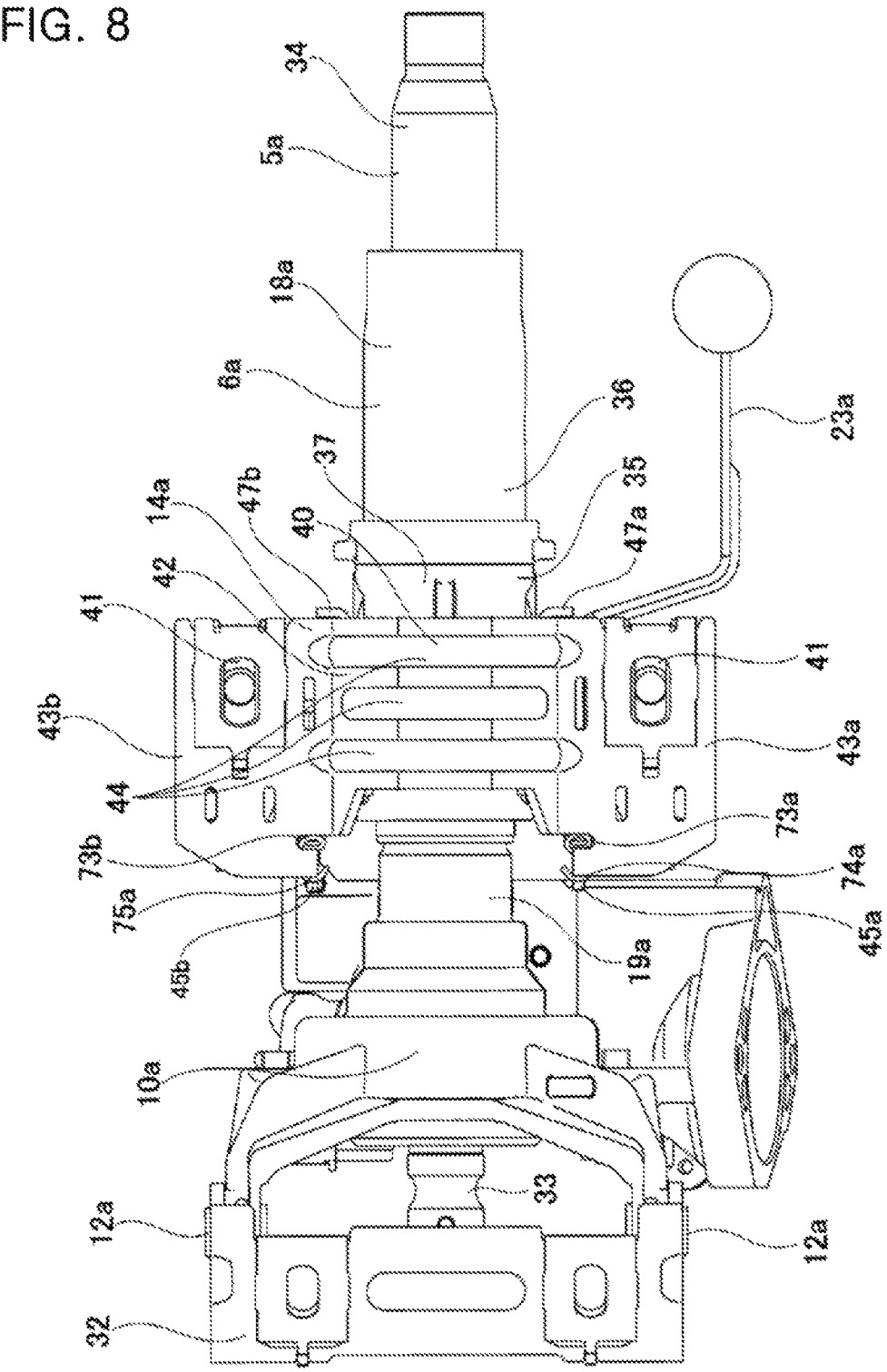
FIG. 8 is a top view of the steering device of the first example.
Figure 9:
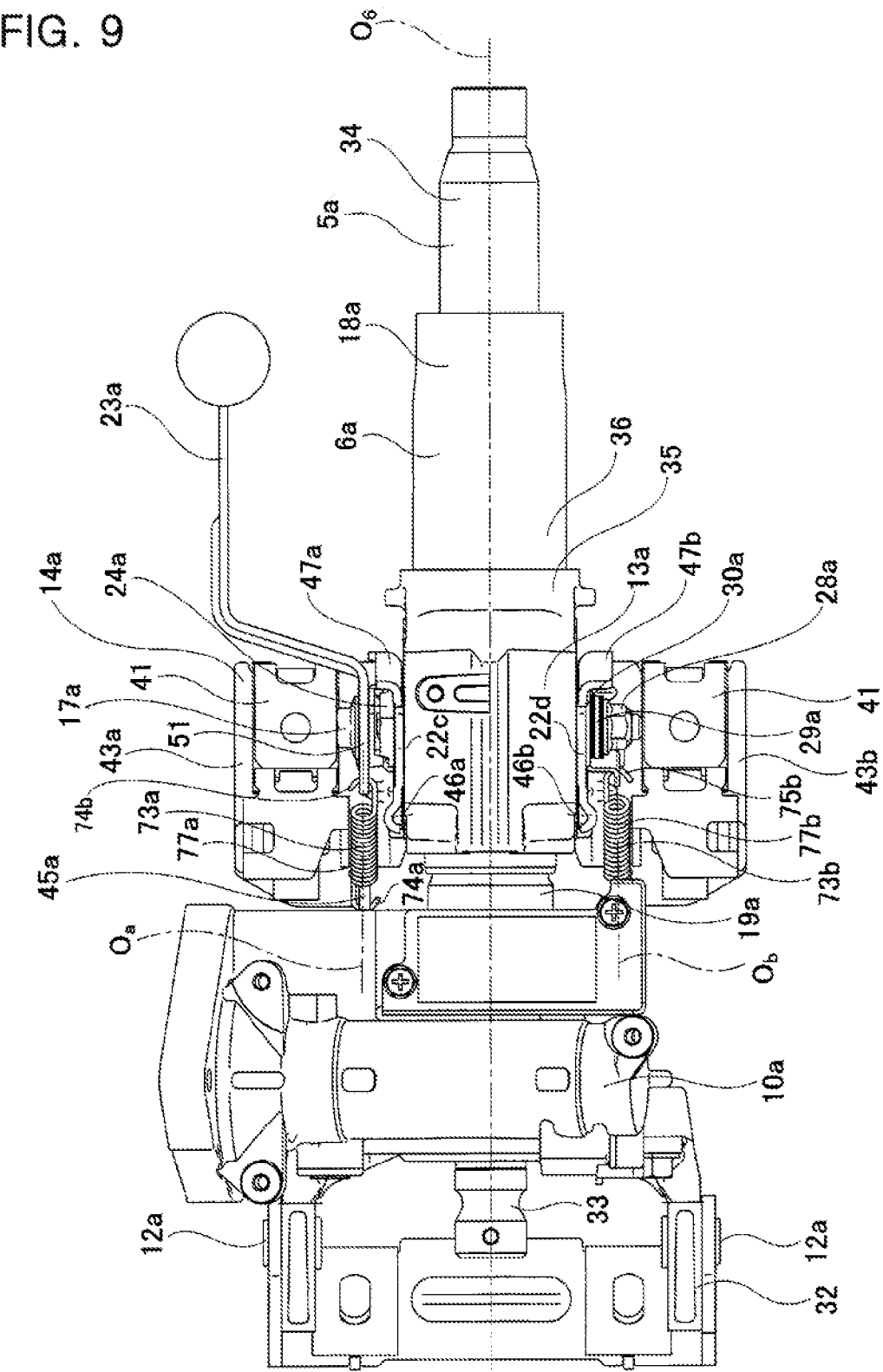
FIG. 9 is a bottom view of the steering device of the first example.

In the present example, in order to prevent the steering column 6a from tilting so that the steering wheel 1 falls when the clamping force is released by contracting the dimension in the width direction of the cam apparatus 24a to adjust the position the steering wheel 1, a pair of tension springs 73a, 73b are provided on both sides on the outside in the width direction of the pair of support plate sections 22c, 22d of the support bracket 14a. In the present example, the pair of tension springs 73a, 73b is made of spring steel such as stainless and piano wire, and is configured by the same coil springs having the same spring constant and the same length in a free state. As illustrated in FIG. 9, each center axis $O_a$, $O_b$, of the pair of tension springs 73a, 73b is arranged so as to be slightly inclined by a few degrees (for example, 1 to 5 degrees) with respect to the center axis $O_6$ of the steering column 6a in a direction toward the outside in the width direction toward the forward direction (away from each other), or arranged so as to be parallel to each other. As illustrated in FIG. 6 and FIG. 7, each of the center axis $O_a$, $O_b$ of the pair of tension springs 73a, 73b is inclined by a several tens of degrees (for example, 30 to 50 degrees) in the upward direction toward the forward direction. In the present example, the inclination angle of the steering column 6a with respect to the center axis $O_6$ in the width direction is substantially the same as one tension spring 73a and the other tension spring 73b.

The one tension spring 73a of the pair of tension springs 73a, 73b comprises a U-shaped hook section 74a that is provided at one end section, a U-shaped hook section 74b that is provided at the other end section, and a coil section 77a that is provided in the middle section. The hook section 74a is locked to the locking arm portion 45a of one side plate section 43a from the outside in the width direction. The hook section 74b is locked to the spring locking hole 53 of the base section 51 of the adjustment lever 23a from the inside in the width direction. Due to this, one tension spring 73a is arranged so as to be bridged between the one side plate section 43a and the base section 51 of the adjustment lever 23a. A force F1 directed obliquely forward and upward is applied to the base section 51 of the adjustment lever 23a by the one tension spring 73a, and as illustrated in FIG. 14, the front-side surface of the engaging convex section 27a of the driven-side cam 26a is elastically pressed to the front side edge of the long hole 15c in the up-down direction of one support plate section 22c.

The other tension spring 73b of the pair of tension springs 73a, 73b comprises a U-shaped hook section 75a that is provided at one end section, a U-shaped hook section 75b that is provided at the other end section, and a coil section 77b that is provided in the middle section. The hook section 75a is locked to the locking arm portion 45b of the other side plate section 43b from the outside in the width direction. The hook section 75b is locked to the spring locking hole 72 of the top half section 71 of the locking plate section 69 of the pressing plate 30a. Due to this, the other tension spring 73b is arranged so as to be bridged between the other side plate section 43b and the pressing plate 30a. A force F2 directed obliquely forward and upward is applied to the pressing plate 30a by the other tension spring 73b.

In the steering device of the present example, a force directed obliquely forward and upward is applied to the both end portions of the adjustment rod 17a by the pair of tension springs 73a, 73b that are provided on both sides on the outside in the width direction of the support bracket 14a. Therefore, an upward force is applied to the outer column 18a and it becomes possible to prevent the steering column 6a from tilting when adjusting the position of the steering wheel 1 (when unclamping), and the up-down position of the steering wheel 1 can be adjusted with a light force.

Next, the force applied from one tension spring 73a to the base section 51 of the adjustment lever 23a and the force applied from the other tension spring 73b to the pressing plate 30a will be specifically described.

As the position of the spring locking hole 53 of the base section 51 of the adjustment lever 23a moves in an arc around the center axis $O_{17}$ of the adjustment rod 17a due to the swinging operation of the adjustment lever 23a, the distance from the spring locking hole 53 to the locking arm portion 45a changes. Therefore, regarding the one tension spring 73a that is bridged between the locking arm portion 45a and the spring locking hole 53 as well, the inclination angle with respect to the center axis $O_6$ of the steering column 6a and its entire length changes due to the swinging operation of the adjustment lever 23a. In the present example, in order to make the inclination angle θ1 of the one tension spring 73a with respect to the center axis $θ_6$ of the steering column 6a and the entire length L1 of the one tension spring 73a that are illustrated in FIG. 15(B)(a) and the inclination angle θ2 of the other tension spring 73b with respect to the center axis $O_6$ of the steering column 6a and the entire length L2 of the other tension spring 73b that are illustrated in FIG. 7 become the same as each other (θ1=θ2, L1=L2) or substantially become the same (θ1≈θ2, L1≈L2) in a state where the adjustment lever 23a is swung in a direction to reduce the dimension in the width direction of the cam apparatus 24a to move the adjustment lever 23a to the unlocked position, that is, in a state where the adjustment lever 23a is rotated downward, dimensions of related members and assembly phase of the adjustment lever 23a and the driving-side cam 25a are regulated.

As the pressing plate 30a is pressed to the outside surface of the other support plate section 22d and the inside surface of the thrust bearing 29a based on the tension force of the other tension spring 73b, its rotational phase hardly changes even when the adjustment rod 17a is moved in the up-down direction. Therefore, regardless of the up-down position of the adjustment rod 17a, when the adjustment lever 23a is moved to the unlocked position, the one tension spring 73a and the other tension spring 73b have the same inclination angle with respect to the steering column 6a and the same entire length. In the present example, regardless of the up-down position of the adjustment rod 17a, in a state where the adjustment lever 23a is moved to the unlocked position, the acting direction of the force of the pair of tension springs 73a, 73b is upward by a predetermined angle (for example, about 10 to 30 degrees) from the direction of the virtual straight line M (see FIG. 7) orthogonal to the tilt axis 12a and the adjustment rod 17a. In other words, the angle formed by the center axis $O_6$ of the steering column 6a and the acting direction of the force of the tension springs 73a, 73b is larger than the angle formed by the center axis $O_6$ of the steering column 6a and the virtual straight line M. When embodying the present invention, as long as the pair of tension springs applies forces of the same magnitude to each other in the acting direction that is directed diagonally upward by the same angle with respect to the center axis of the steering column to the base section and the locked member in a state where the adjustment lever is swung to the unlocked position, without being limited to be preferred example described above, it is possible to employ a configuration having a structure, shape, and length (mounting positions of both end portions) that are different between one tension spring and the other tension spring.

The force applied from the one tension spring 73a to the base section 51 of the adjustment lever 23a acts as a reaction force (brake) that suppresses the rotation of the driving-side cam 25a.

When the adjustment lever 23a is swung downward to some extent from the clamping position shown in FIG. 15 (A) (a) in order to adjust the position of the steering wheel 1, the driving-side guide inclined surfaces 60 of the driving-side convex sections 58 of the driving-side cam surface 55 are guided to the driven-side guide inclined surfaces 65 of the driven-side convex sections 64 of the driven-side cam surface 62. During this, not only does the inertial force act on the driving-side cam 25a, but also the elastic restoring force of the pair of clamped plate sections 21c, 21d and the weight of the adjustment lever 23a act on the driving-side cam 25a, therefore, the driving-side cam 25a is biased in the direction of rotation and tends to rotate with much force. When the adjustment lever 23a is swung downward and the spring locking hole 53 moves upward, at a predetermined position, the hook section 74a on the one end side and the hook section 74b on the other end side of the one tension spring 73a and the center axis $O_{17}$ of the adjustment rod 17a are aligned on the same straight line, and the tension spring 73a becomes to be in the most contracted state. In order to swing the adjustment lever 23a further downward from the predetermined position (to further rotate the driving-side cam 25a), it is required to extend the one tension spring 73a, so the spring force of the one tension spring 73a acts as a reaction force. That is, a force against the downward swinging motion of the adjustment lever 23a is applied from the one tension spring 73a to the base section 51 of the adjustment lever 23a.

In the present example, before the adjustment lever 23a moves to the lower swing limit (swing lower end), the mounting position of the one tension spring 73a and the assembly phase of the adjustment lever 23a and the driving-side cam 25a are regulated so that the hook section 74a of the one end side and the hook section 74b of the other end side of one tension spring 73a and the center axis $O_{17}$ of the adjustment rod 17a are aligned on the same straight line. Due to this, in the present example, when the adjustment lever 23a is swung downward from the clamping position, regardless of the biasing force of the direction of rotation as described above, as illustrated in FIG. 15 (B) (b), during the phase where the driving-side guide inclined surfaces 60 are being guided to the driven-side guide inclined surfaces 65, in other words, before the adjustment lever 23a moves to the swing lower end, the downward swinging operation of the adjustment lever 23a automatically stops by using the force of the one tension spring 73a. Therefore, the downward swinging operation of the adjustment lever 23a stops before the dimension in the width direction of the cam apparatus 24a becomes the smallest by the driving-side cam surface 55 and the driven-side cam surface 62 coming into full contact with each other. Accordingly, in a state where the adjustment lever 23a is moved to the unclamping position, the driving-side cam surface 55 and the driven-side cam surface 62 are in a state of partial contact. Specifically, only the driving-side guide inclined surfaces 60 and the driven-side guide inclined surfaces 65 abut to form gaps 76a between the tip-end surfaces of the driving-side convex sections 58 and the driven-side basal surface 63, gaps 76b between the tip-end surfaces of the driven-side convex sections 64 and the driving-side basal surface 57, and gaps 76c between the driving-side stopper surfaces 59 and the driven-side stopper surfaces 66.

With the steering device of the present example, when the adjustment lever 23a is swung downward from the clamping position, it is possible to prevent collision between the tip-end surfaces of the driving-side convex sections 58 and the driven-side basal surface 63, between tip-end surfaces of the driven-side convex sections 64 and the driving-side basal surface 57, and between the driving-side stopper surfaces 59 and the driven-side stopper surfaces 66 collide with much force respectively, and occurrence of noise (metal contact sound) caused by these. Further, as illustrated in FIG. 15 (B) (b), the dimension in the width direction of the cam apparatus 24*a* in the unlocked state can be increased by the amount of the gaps 76*a* between the tip-end surfaces of the driving-side convex sections 58 and the driven-side basal surface 63 and the gaps 76*b* between the tip-end surfaces of the driven-side convex sections 64 and the driving-side basal surface 57. Therefore, it is possible to suppress occurrence of looseness in the width direction in the cam apparatus 24*a* between the inside surface of the head portion 48 and the outside surface of the one support plate section 22*c*, as well as to suppress occurrence of looseness in the width direction in the thrust bearing 29*a* and the pressing plate 30*a* between the inside surface of the nut 28*a* and the outside surface of the other support plate section 22*d*. Further, since the rotation of the driving-side cam 25*a* can be braked by the one tension spring 73*a*, it is also possible to prevent the adjustment lever 23*a* from swinging with much force and thus part of the adjustment lever 23*a* colliding with a driver's fingers or the like.

The force applied from the other tension spring 73*b* to the pressing plate 30*a* causes a moment to act on the pressing plate 30*a*.

In the present example, the hook section 75*b* of the other tension spring 73*b* is locked to the top half section 71 of the locking plate section 69 that is provided in a position shifted (offset) in the width direction with respect to the plate body 68 that is externally fitted onto the adjustment rod 17*a*. Therefore, as illustrated in FIG. 13, based on the force F2 applied from the other tension spring 73*b*, with a bent section between the plate body 68 and the base half section 70 of the locking plate section 69 as a fulcrum, a moment in the direction of the arrow a is applied to the pressing plate 30*a* around the virtual straight line Z that extends in the extending direction of a bent section. Due to this, the plate body 68 can apply to the outside surface of the other support plate section 22*d* and the inside surface of the thrust bearing 29*a* a force in a direction away from each other. Accordingly, as similar to the disc spring 50, even when the clamping force is released, it is possible to suppress occurrence of looseness in the width direction in the cam apparatus 24*a* between the inside surface of the head portion 48, which is a displacement regulating portion, and the outside surface of the one support plate section 22*c*, as well as to suppress occurrence of looseness in the width direction in the thrust bearing 29*a* between the inside surface of the nut 28*a*, which is a regulating portion, and the outside surface of the plate body 68.

Due to this, when the clamping force is released, it is possible to prevent the one end side of the adjustment rod 17*a* from tilting so as to displace downward due to the weight of the adjustment lever 23*a*. Therefore, as the adjustment rod 17*a* cannot displace smoothly in the long hole 15*c* in the up-down direction when adjusting the up-down position of the steering wheel 1, it is possible to prevent the adjustment lever 23*a* from vibrating (roughing) in the up-down direction. As a result, it is possible to prevent occurrence of noise (rattling sound), and it is also possible to prevent a slight vibration from being transmitted to the steering wheel 1.

With the steering device of the present example, not only is it possible to reduce the force required for adjusting the up-down position of the steering wheel 1, but also is it possible to ensure smoothness of the work of adjusting the forward-backward position of the steering wheel 1. That is, the pair of tension springs 73*a*, 73*b* is provided on both sides on the outside in the width direction of the pair of support plate sections 22*c*, 22*d* of the support bracket 14*a*, and a force directed obliquely forward and upward is applied respectively to the base section 51 of the adjustment lever 23*a* and the pressing plate 30*a* that are provided on both end sides of the adjustment rod 17*a*. Therefore, as an upward force (component force) is applied to the outer column 18*a*, when the clamping force is released during adjustment of the position of the steering wheel 1, it is possible to prevent the steering column 6*a* from tilting so that the steering wheel 1 falls, as well as to reduce the force required for adjusting the up-down position of the steering wheel 1.

As the acting direction of the force from the pair of tension springs 73*a*, 73*b* is not directed upward along the extending direction of the pair of long holes 15*c*, 15*d* in the up-down direction but is directed obliquely forward and upward, the component force in the upward direction can be kept low.

The front-side surface of the engaging convex section 27*a* of the driven-side cam 26*a* elastically abuts the front side edge of the long hole 15*c* in the up-down direction of the one support plate section 22*c*, therefore, when the adjustment rod 17*a* moves upward, it is possible to generate frictional force between the front-side surface of the engaging convex section 27*a* and the front side edge of the long hole 15*c* in the up-down direction. Due to this, it is possible to reduce the force to press the adjustment rod 17*a* to the upper surfaces of the inner circumferential surfaces of the long holes 16*c*, 16*d* in the forward-backward direction, so that the sliding resistance between the outer circumferential surface of the adjustment rod 17*a* and the upper surfaces of the long holes 16*c*, 16*d* in the forward-backward direction is reduced. Accordingly, it is possible to prevent the force required for adjusting the forward-backward position of the steering wheel 1 from increasing, and the smoothness of the work of adjusting the forward-backward position of the steering wheel 1 can be ensured.

In the steering device of the present example, when compared to the conventional structure, the force of the adjustment rod 17*a* pushing the upper surfaces of the long holes 16*c*, 16*d* in the forward-backward direction is likely to be weak, therefore, the acting direction of the force of the pair of tension springs 73*a*, 73*b* is made to be upward by a predetermined angle with respect to the direction of the virtual straight line M orthogonal to the center axis of the tilt axis 12*a* and the center axis of the adjustment rod 17*a* so as to prevent the pushing force from becoming too low.

In the present example, in a state where the adjustment lever 23*a* is moved to the unlocked position, the pair of tension springs 73*a*, 73*b* apply to the base section 51 of the adjustment lever 23*a* and the pressing plate 30*a* forces having the same magnitude in the same direction. Due to this, it is possible to stabilize the posture of the adjustment rod 17*a* when adjusting the position of the steering wheel 1 so as to prevent the adjustment rod 17*a* from tilting up and down.

In the present example, the acting direction of the force by the pair of tension springs 73*a*, 73*b* is not the upper direction along the extending direction of the pair of long holes 15*c*, 15*d* in the up-down direction but the obliquely forward and upward direction, therefore, the component force in the upward direction can be kept low, and it is also possible to generate a frictional force between the front-side surface of the engaging convex section 27*a* and the front side edge of the long hole 15c in the up-down direction. Due to this, when the clamping force is released, the position of the steering wheel 1 can be kept in the position in a state where the clamping force is released. Therefore, it is possible to achieve a configuration which has been required for a steering device, which does not cause a sudden jump or sudden drop to the steering wheel 1 when the clamping force is released.

In the present example, preferably, each center axis $O_a$, $O_1$, of the pair of tension springs 73a, 73b is tilted in a direction toward outside in the width direction (away from each other) toward the forward direction with respect to the center axis $O_6$ of the steering column 6a. In this case, it is possible to apply a component force that is directed toward outside in the width direction to the base section 51 of the adjustment lever 23a and the pressing plate 30a respectively. From this aspect as well, it is possible to prevent the cam apparatus 24a and the thrust bearing 29a from getting loose in the width direction when the clamping force is released.

Since the base section 51 of the adjustment lever 23a is pulled in the obliquely forward and upward by the one tension spring 73a, when the clamping force is released, it is possible to prevent the one end side of the adjustment rod 17a from tilting so as to displace downward due to the weight of the adjustment lever 23a. Therefore, as the adjustment rod 17a cannot displace smoothly in the long hole 15c in the up-down direction when adjusting the up-down position of the steering wheel 1, it is possible to prevent the adjustment lever 23a from vibrating (roughing) in the up-down direction. As a result, it is possible to prevent occurrence of noise (rattling sound), and it is also possible to prevent a slight vibration from being transmitted to the steering wheel 1.

When the adjustment lever 23a is swung downward to some extent in order to adjust the position of the steering wheel 1, the driving-side cam 25a tends to rotate with much force. During this, the driven-side cam 26a also tends to rotate about the adjustment rod 17a based on the concave and convex engagement between the driving-side cam surface 55 and the driven-side cam surface 62. However, in the present example, since the front-side surface of the engaging convex section 27a of the driven-side cam 26a is elastically pressed to the front side edge of the long hole 15c in the up-down direction by the elasticity of the tension spring 73a, it is possible to effectively prevent the driven-side cam 26a from rotating. Accordingly, it is possible to prevent occurrence of noise (metal contact sound) due to the side surface in the forward-backward direction of the engaging convex section 27a and the side edge in the forward-backward direction of the long hole 15c in the up-down direction collide with much force.

When the steering wheel 1 is moved to the forward side as much as possible so as to hold the adjustment rod 17a between the edges on the rear ends of the pair of long holes 16c, 16d in the forward-backward direction and the front side edges of the pair of long holes 15c, 15d in the up-down direction during adjustment of the forward-backward position of the steering wheel 1 as well, as the front-side surface of the engaging convex section 27a abuts the front side edge of the long hole 15c in the up-down direction in advance, it is also possible to prevent occurrence of collision sound due to the front-side surface of the engaging convex section 27a and the front side edge of the long hole 15c in the up-down direction collide with much force.

It is also possible to employ a configuration in which an extended arm section that extends from the base section is provided in part of the base section of the adjustment lever and attach an end section of one tension spring 73a to a position shifted in the width direction from the base section of the extended arm section. By employing such a configuration, it is also possible to apply the same moment as that applied to the pressing plate 30a to the adjustment lever based on the force applied from the one tension spring 73a.

In the present example, although the present invention is applied to a steering device comprising both a tilt mechanism and a telescopic mechanism, it is also possible to apply the present invention to a steering device comprising only a tilt mechanism.

In the present example, although a combination of a cam apparatus and an adjustment lever is employed as an expansion and contraction device, and a combination of a driven-side cam of the cam apparatus and a pressing plate as a pair of pressing sections, other known configurations can also be employed. For example, it is also possible to employ a configuration in which a bolt is employed as an adjustment rod, the bolt comprising a head portion in its base section and a male screw in its tip end section, a nut having a female screw capable of being screwed onto the male screw is attached to the tip end section of the bolt, and the base section of the bolt or the nut can be rotated by the adjustment lever. In this case, the adjustment lever and the head portion of the bolt or the nut can not configure the expansion and contraction device, and the inside surface of the head portion of the bolt and the inside surface of the nut configure the pair of pressing sections.

In the present example, the base section 51 of the adjustment lever 23a and the pressing plate 30a respectively function a locked member. However, the locked member can be provided independently of these members. Further, the locked member can also be configured by any one pressing section of the pair of pressing sections or part of it, or by the expansion and contraction mechanism or part of it. For example, the locked member can be configured by a member such as a cam apparatus or a member such as a washer that is provided in a section of the adjustment rod 17a protruding from the outside surface of the one support plate section 22c of the pair of support plate sections 22c, 22d, or by a member such as a bearing ring such as a thrust bearing that is provided in a section of the adjustment rod 17a protruding from the outside surface of the other support plate section 22d of the pair of support plate sections 22c, 22d.

Second Example

Figure 16:
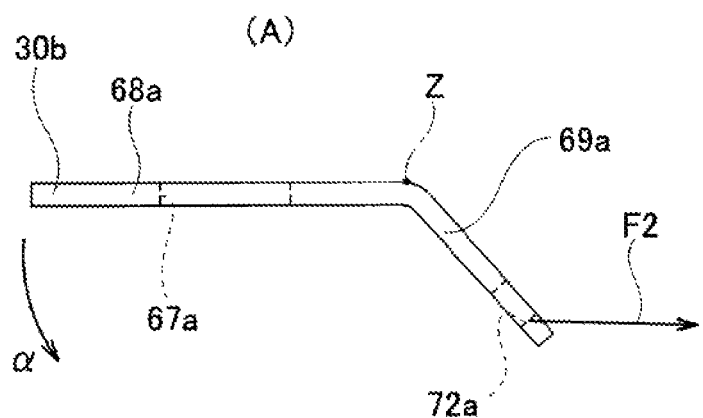
FIG. 16 (A) and FIG. 16 (B) illustrate a pressing plate that is incorporated into a steering device of a second example of an embodiment of the present invention, and FIG. 16 (A) is a top view of the pressing plate, and FIG. 16 (B) is a front view of the pressing plate.
Figure 16:
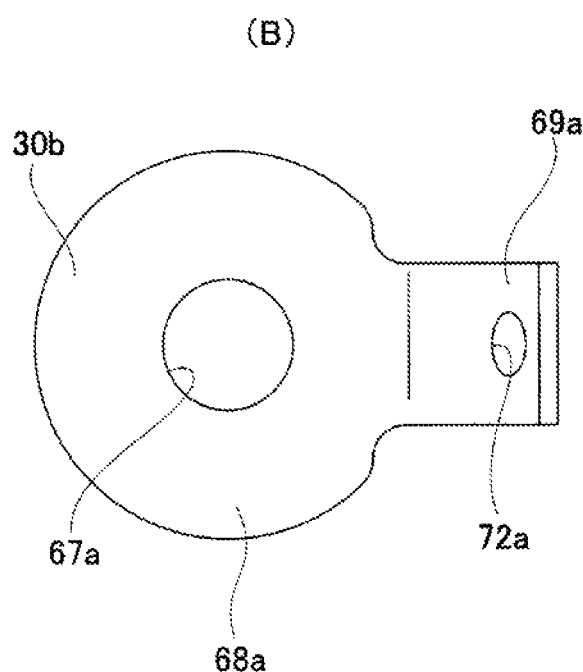

FIG. 16(A) to FIG. 16(B) illustrate a second example of an embodiment of the present invention. The pressing plate 30b used in the present example comprises a circular plate body 68a which has an insertion hole 67a through which the adjustment rod 17a is inserted, and is externally fitted onto the adjustment rod 17a, the plate body 68 corresponding to an outer fitting section, and a locking plate section 69a having a flat plate shape that is provided in one location in the circumferential direction of the outer circumferential edge of the plate body 68. The locking plate section 69a extends obliquely in a direction toward the forward direction side (outside in the radial direction of the plate body 68) toward outside in the width direction (the axial direction of the plate body 68) from the outer circumferential edge section of the plate body 68. That is, the locking plate section 69a corresponds to an extended arm section which extends obliquely in a direction opposite to the plate body 68 toward outside in the width direction from the outer circumferential edge of the outer fitting section (plate body 68a). The locking plate section 69a comprises a spring locking hole 72a for locking an end section of the other tension spring 73b in a top half section that is arranged in a location shifted in the width direction from the plate body 68a.

In the present example as well, it is possible to apply a moment to the pressing plate 30b based on the force applied from the other tension spring 73b to the pressing plate 30b. That is, an end section of the other tension spring 73b is locked to the spring locking hole 72a of the locking plate section 69a, which is provided in a location shifted in the width direction with respect to the plate body 68a that is externally fitted onto the adjustment rod 17a. Therefore, based on the force F2 applied from the other tension spring 73b, with a bent section between the plate body 68a and the base end section of the locking plate section 69a as a fulcrum, a moment in the direction of the arrow a is applied to the pressing plate 30a around the virtual straight line Z that extends in the extending direction of a bent section. Due to this, the plate body 68a can apply to the outside surface of the other support plate section 22d and the inside surface of the thrust bearing 29a a force in a direction away from each other. The configuration and operational effects of the other parts of the second example are the same as those of the first example.

Third Example

Figure 17:
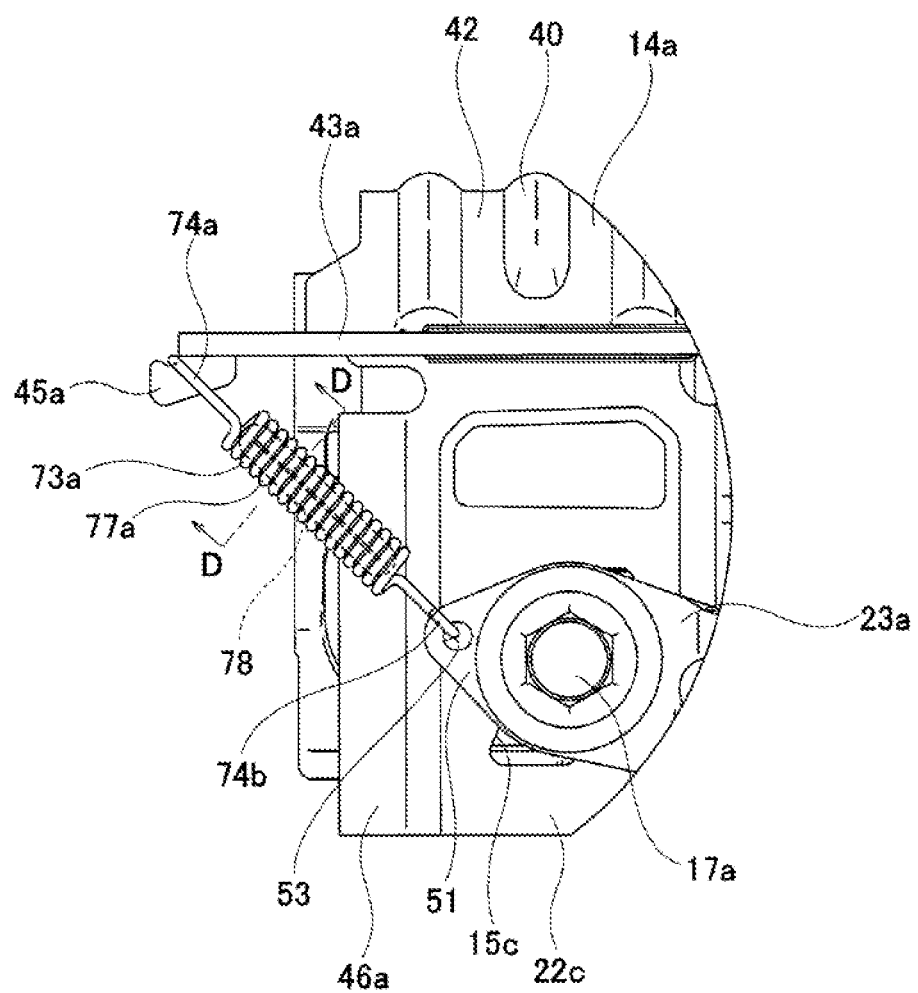
FIG. 17 is an enlarged view of a section that corresponds to a left-right middle section of FIG. 6 with part omitted illustrating a third example of an embodiment of the present invention.
Figure 18:
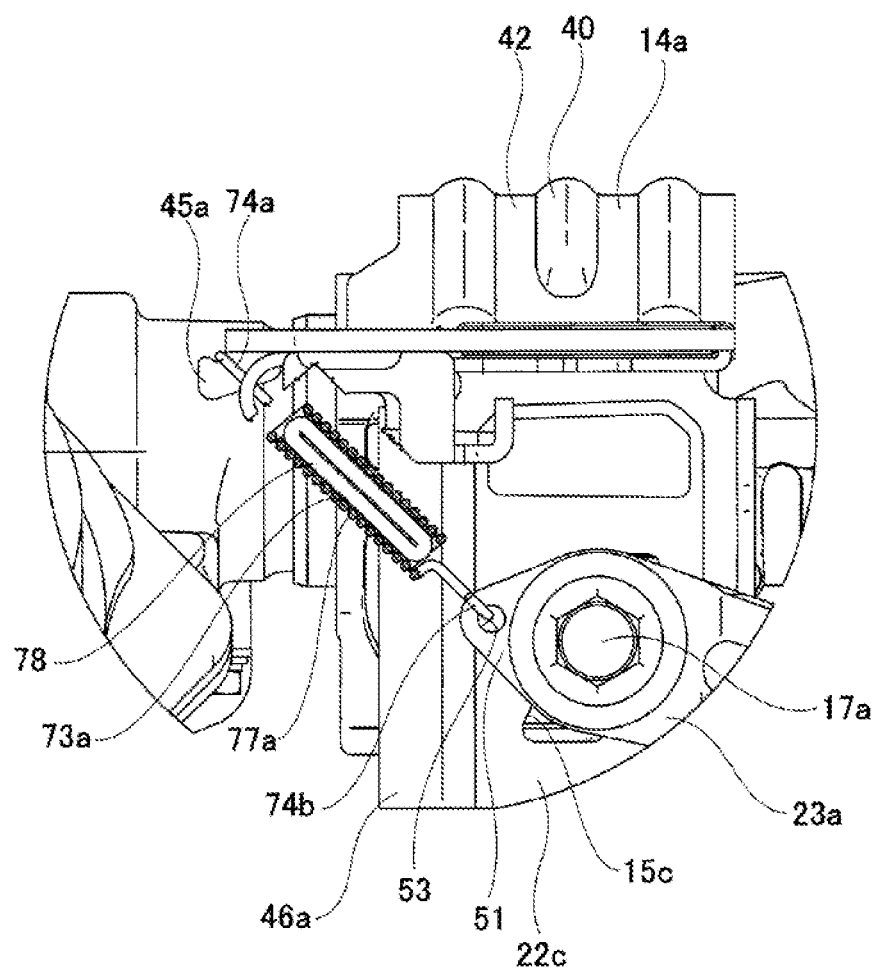
FIG. 18 is an enlarged view in partial cross-section of a section that corresponds to the left-right middle section of FIG. 6 illustrating the third example.
Figure 19:
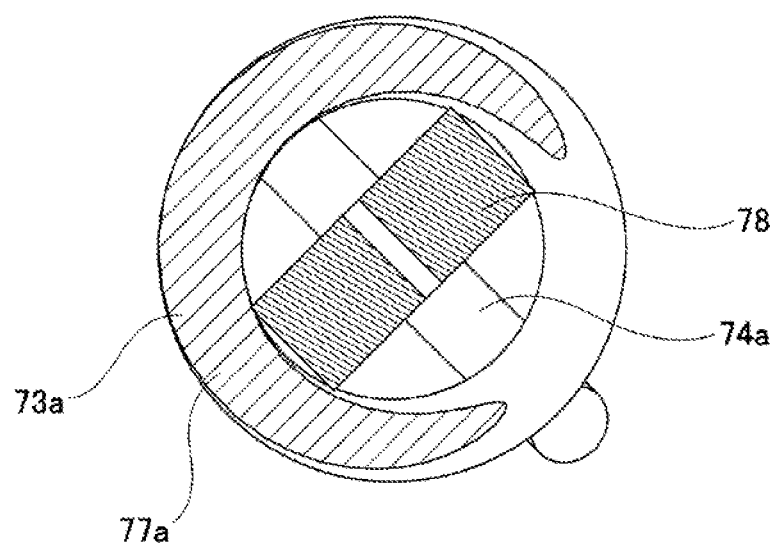
FIG. 19 is a cross-sectional view taken along section line D-D in FIG. 17.

FIG. 17 to FIG. 19 illustrate a third example of an embodiment of the present invention. In the present example, in order to prevent the pair of tension springs 73a, 73b from generating noise during adjustment of the up-down position of the steering wheel 1 or the swinging operation of the adjustment lever 23a, the pair of tension springs 73a, 73b comprises a damper member 78 which is provided inside the coil sections 77a, 77b.

The damper member 78 is made of an elastic material such as rubber or synthetic resin, and has a cylindrical shape and a substantially rectangular cross-sectional shape as a whole in a free state. The damper member 78 is provided inside the coil sections 77a, 77b in a state where the damper member 78 is deformed. Specifically, in a state where the parts of the damper member 78 located on the opposite sides to each other in the radial direction are crushed (folded) so as to be close to each other and the entire damper member 78 is deformed into a linear shape (plate shape), the damper member 78 is inserted so as to be pushed inside the coil sections 77a, 77b. In a state where the damper member 78 is provided inside the coil sections 77a, 77b, the outer circumferential surface of the damper member 78 elastically abuts the inner circumferential surface of the coil sections 77a, 77b.

In order to prevent the damper member 78 from moving in the axial direction of the coil sections 77a, 77b and falling off from the inside of the coil sections 77a, 77b as the coil sections 77a, 77b expands and contracts during adjustment of the up-down position of the steering wheel 1 and the swinging operation of the adjustment lever 23a, the length (folding diameter) of the damper member 78 in the coil sections 77a, 77b is regulated. Specifically, in order to prevent the damper member 78 from falling off from the upper side of the coil sections 77a, 77b, the length (overlap allowance) of the damper member 78 that exists inside of the coil sections 77a, 77b in a state where the upper end portion of the damper member 78 abuts the lower surface of the locking arm portions 45a, 45b is maintained to be sufficiently long, for example, longer than the distance from the upper end surface of the coil sections 77a, 77b to the lower surface of the locking arm portions 45a, 45b. In order to prevent the damper member 78 from falling off from the lower side of the coil sections 77a, 77b, the length (overlap allowance) of the damper member 78 that exists inside the coil sections 77a, 77b in a state where the lower end portion of the damper member 78 abuts the base section 51 of the adjustment lever 23a and the upper surface of the locking plate section 69 of the pressing plate 30a (see FIG. 7 and FIG. 13) is maintained to be sufficiently long, for example, longer than the distance from the lower end surface of the coil sections 77a, 77b to the base section 51 of the adjustment lever 23a and the upper surface of the locking plate section 69 of the pressing plate 30a. In the present example, the length of the damper member 78, particularly the amount of protrusion from the coil sections 77a, 77b is regulated so that the damper member 78 that is provided inside the coil sections 77a, 77b is prevented from being damaged by attachment jigs of the tension springs 73a, 73b when installing the tension springs 73a, 73b.

In the present example, it is possible to prevent the coil sections 77a, 77b from generating noise such as popping sound and reverberation sound during adjustment of the up-down position of the steering wheel 1 and the swinging operation of the adjustment lever 23a. That is, during adjustment of the up-down position of the steering wheel 1 and the swinging operation of the adjustment lever 23a, the locations of the spring locking hole 53 of the adjustment lever 23a and the spring locking hole 72 of the pressing plate 30a with respect to the locking arm portions 45a, 45b change. Therefore, there is a possibility that the hook section 74b, 75b of the tension springs 73a, 73b may move along the inner peripheral edges of the spring locking holes 53, 72, which are circular holes respectively, and may cause stick-slip (a slight vibration). When stick-slip occurs, vibration may be transmitted to the tension springs 73a, 73b, and the coil sections 77a, 77b may generate noise as speakers. In the present example, as the damper member 78 that function as a sound absorbing material is provided inside the coil sections 77a, 77b, it is possible to reduce the vibration of the coil sections 77a, 77b so as to effectively prevent the coil sections 77a, 77b from generating noise.

Since the change in the rotational phase of the pressing plate 30a that occurs when the up-down position of the steering wheel 1 is adjusted is a little, the amount in which the hook section 75b of the tension spring 73b (see FIG. 7) moves along the inner peripheral edge of the spring locking hole 72 of the pressing plate 30a is a little. Therefore, it is also possible to employ a configuration in which the damper member 78 is only provided inside the coil section 77a of the one tension spring 73a and is not provided inside the coil section 77b of the other tension spring 73b. The configuration and operational effects of the other parts of the third example are the same as those of the first example.

Fourth Example

Figure 20:
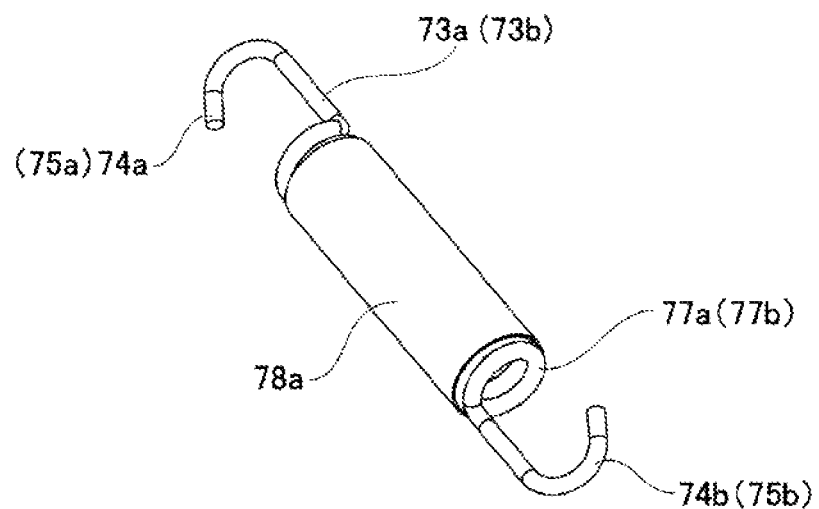
FIG. 20 (A) and FIG. 20 (B) illustrate a tension spring that is incorporated into a steering device of a fourth example of an embodiment of the present invention, and FIG. 20 (A) is a perspective view of the tension spring, and FIG. 20 (B) is an end view of the tension spring.
Figure 20:
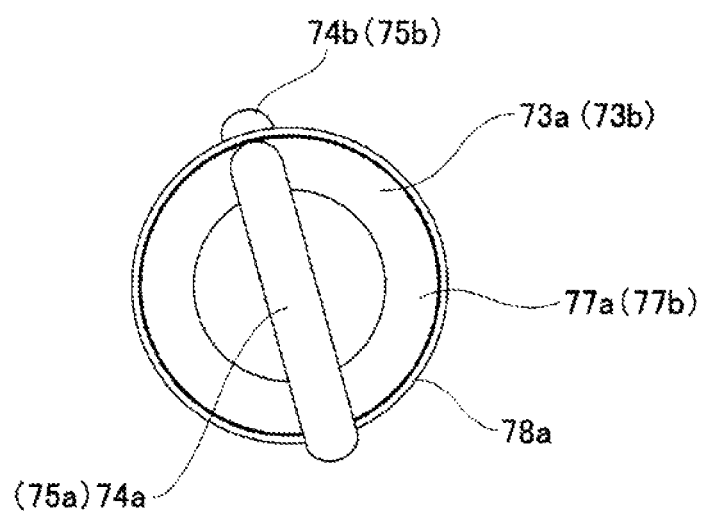

FIG. 20 illustrates a fourth example of an embodiment of the present invention. In the present example, a damper member 78a is provided outside the coil sections 77a, 77b of the tension springs 73a, 73b. The damper member 78a is made of an elastic material such as rubber and synthetic resin, and has a cylindrical shape having an inner diameter that is slightly smaller than the outer diameter o the coil sections 77a, 77b in a free state. The damper member 78a is externally fitted onto the outside of the coil sections 77a, 77b in a state where its inner diameter is elastically expanded slightly. In a state where the damper member 78a is provided outside the coil sections 77a, 77b, the inner circumferential surface of the damper member 78a elastically abuts the outer circumferential surface of the coil sections 77a, 77b.

In the present example, since the damper member 78a can be visually recognized from the outside, it is possible to prevent forgetting to assemble the damper member 78a. The damper member 78a is externally fitted onto the coil sections 77a, 77b, and the hook sections 74a, 74b, 75a, 75b that exist on both sides of the coil sections 77a, 77b are locked to the locking arm portions 45a, 45b, the adjustment lever 23a, and the pressing plate 30a respectively, therefore, it is possible to effectively prevent the damper member 78a from falling off. The configuration and operational effects of the other parts of the fourth example are the same as those of the first and the third examples.

Fifth Example

Figure 21:
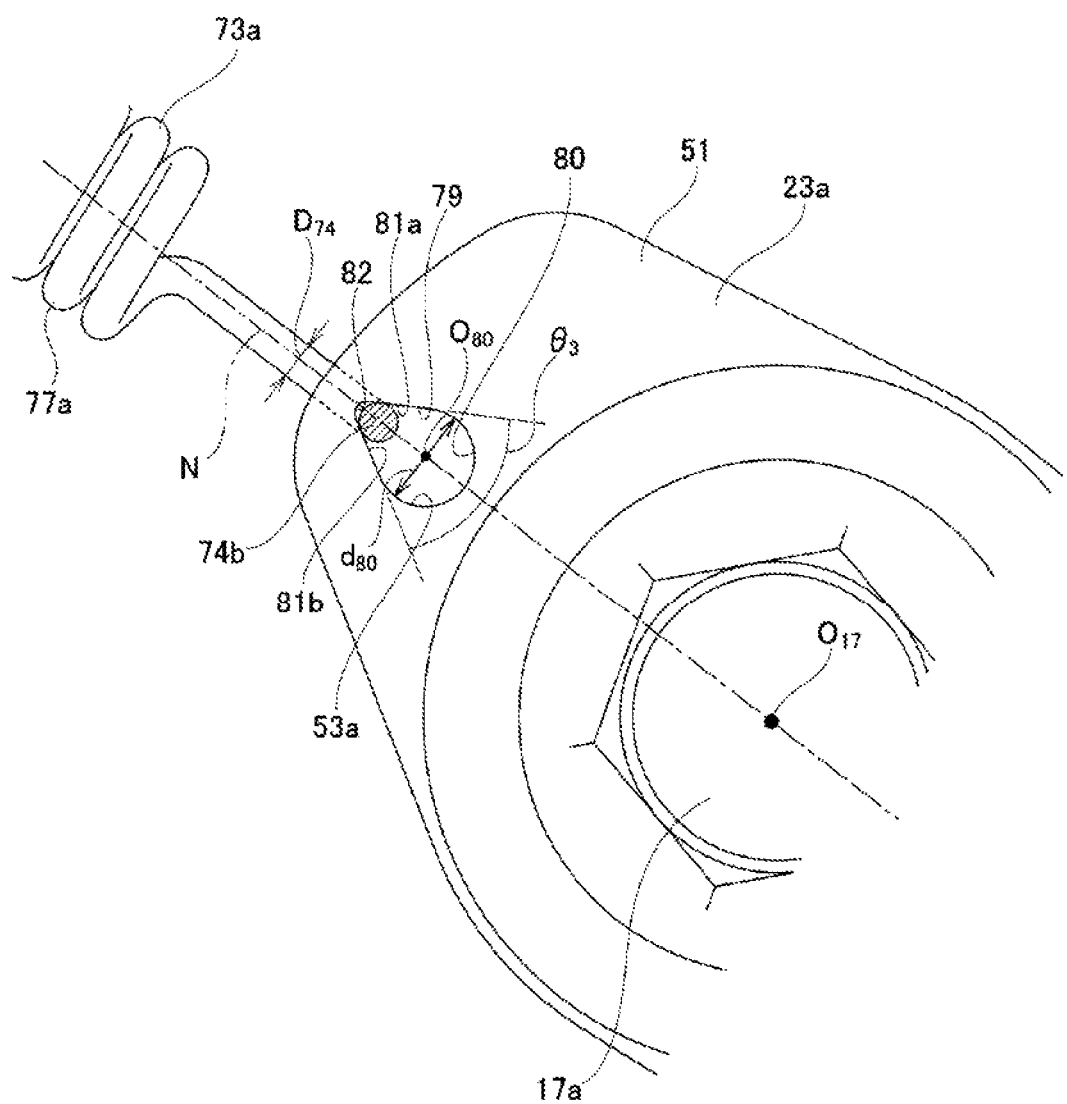
FIG. 21 is a view illustrating a steering device of a fifth example of an embodiment of the present invention with part omitted in a state where a tension spring is locked to a base section of an adjustment lever in a pivotal position in an unlocked state.

FIG. 21 illustrates a fifth example of an embodiment of the present invention. In the present example, the spring locking hole 53a is not a simple circular hole, but an approximate teardrop-shaped opening in which a guide hole section 79 having a substantially triangular opening shape arranged on the front side (the left side in FIG. 21) and a large-diameter hole section 80 having a substantially semi-circular opening arranged on the rear side (the right side in FIG. 21) are combined. The guide hole section 79 has a pair of linear guide sides 81a, 81b inclined toward each other toward the front side, and a partial arc connecting section 82 that connects the front end portions of the pair of guide sides 81a, 81b. The pair of guide sides 81a, 81b are line-symmetric with respect to a virtual straight line N which is orthogonal to the center axis $O_{17}$ of the adjustment rod 17a and passes through the center section in the circumferential direction of the connecting section 82. Further, the center $O_{80}$ of the large-diameter hole section 80 is located on the virtual straight line N. The inner diameter $d_{80}$ of the large-diameter hole section 80 is sufficiently larger than the wire diameter $D_{74}$ of the hook section 74b of the tension spring 73a ($d_{80} > D_{74}$). The radius of curvature of the connecting section 82 is smaller than one half of the wire diameter $D_{74}$ of the hook section 74b. *The size of the angle* $\theta_3$ between the pair of guide sides 81a, 81b is determined in consideration of the wire diameter $D_{74}$ of the hook section 74b and the shape of the base section 51 and the like, and, for example, it is in a range of 30 to 90 degrees, preferably in a range of 45 to 75 degrees. In the illustrated example, the size of the angle $\theta_3$ is 60 degrees.

In a state where the hook section 74b is locked to the spring locking hole 53a, the hook section 74b is pulled by the elastic restoring force of the coil section 77a in a direction in which the space between the pair of guide sides 81a, 81b becomes smaller, which is a direction toward the connecting section 82. Due to this, the hook section 74b is elastically pressed between the pair of guide sides 81a, 81b (bites like a wedge), and is elastically pressed against the pair of guide sides 81a, 81b. A gap exists between the hook section 74b and the connecting section 82, and between the hook section 74b and the large-diameter hole section 80, respectively. In other words, the hook section 74b only comes in contact with the pair of guide sides 81a, 81b. Moreover, since the inner diameter $d_{80}$ of the large-diameter hole section 80 is sufficiently larger than the wire diameter $D_{74}$ of the hook section 74b, the hook section 74b can be loosely inserted into the large-diameter hole section 80.

In the present example, in a state where the hook section 74b of the tension spring 73a is locked to the spring locking hole 53a of the adjustment lever 23a, the hook section 74b is elastically pressed between the pair of guide sides 81a, 81b and pressed against the pair of guide sides 81a, 81b by the elastic restoring force of the coil section 77a. Due to this, even when the up-down position of the steering wheel 1 is adjusted and the swinging operation of the adjustment lever 23a is performed, the movement of the hook section 74b is restricted by the pair of guide sides 81a, 81b, and it is possible to prevent the hook section 74b from moving (sliding) along the inner peripheral edge of the spring locking hole 53a. Due to such a configuration, even when the up-down position of the steering wheel 1 is adjusted and the swinging operation of the adjustment lever 23a is performed, it is possible to prevent the contact position between the hook section 74b and the pair of guide sides 81a, 81b from changing, so it is possible to prevent occurrence of stick-slip between the tension spring 73a and the adjustment lever 23a.

Furthermore, the inner diameter $d_{80}$ of the large-diameter hole section 80 is made sufficiently larger than the wire diameter $D_{74}$ of the hook section 74b so that the hook section 74b can be loosely inserted into the large-diameter hole section 80. Therefore, since the hook section 74b can be easily inserted into the spring locking hole 53a, it is possible to ensure the workability of assembling the steering device. The configuration and operational effects of the other parts of the fifth example are the same as those of the first through the fourth examples.

Sixth Example

Figure 22:
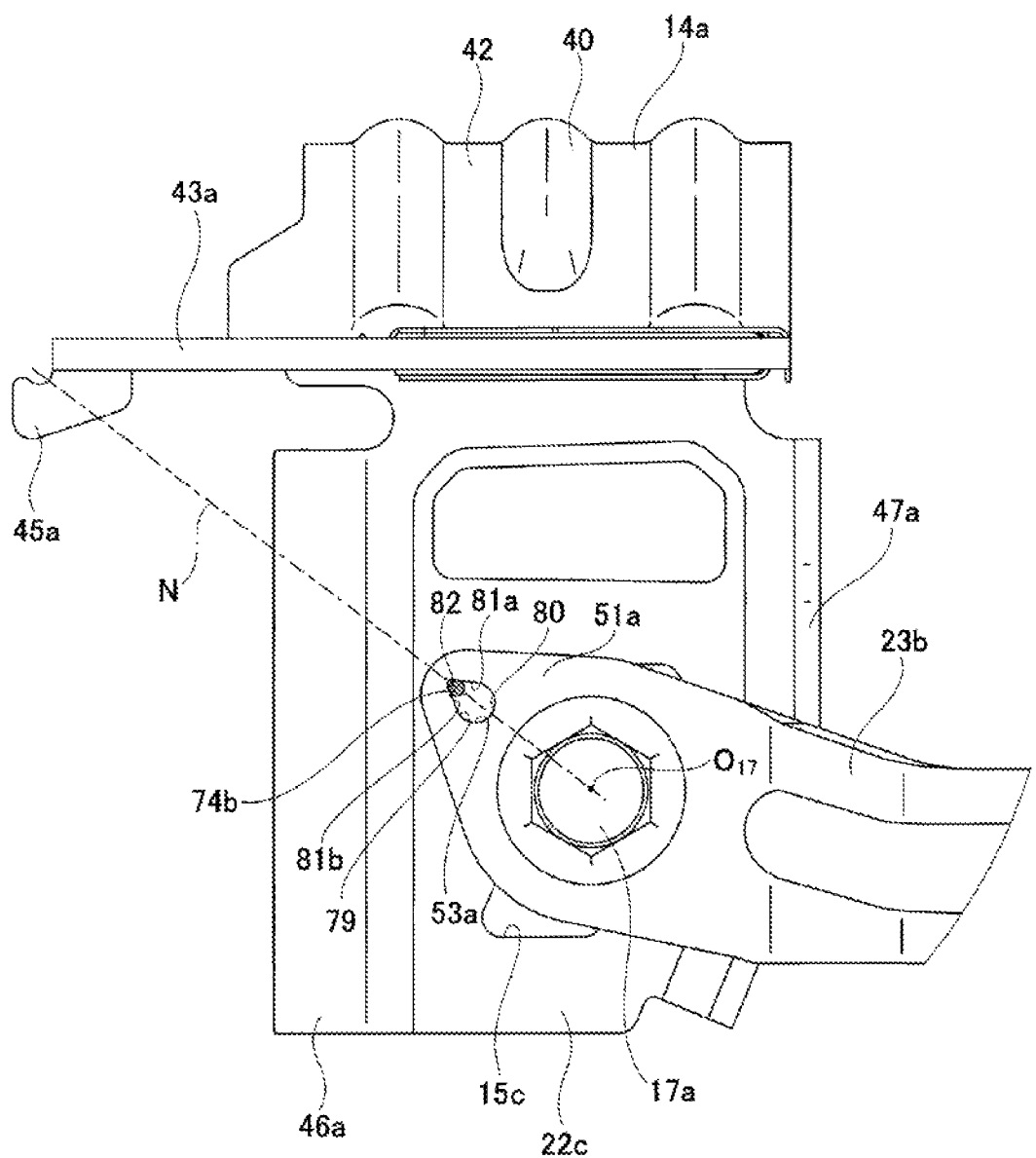
FIG. 22 is a view illustrating a steering device of a sixth example of an embodiment of the present invention with part omitted in a state where a tension spring is locked to a base section of an adjustment lever in a pivotal position in an unlocked state.

FIG. 22 illustrates a sixth example of an embodiment of the present invention. In the present example, the shape of the base section 51a of the adjustment lever 23b is changed from the configuration of the fifth example. Specifically, the front side section of the base section 51a has a substantially triangular tapered shape, and a virtual straight line N that is orthogonal to the center axis $O_{17}$ of the adjustment rod 17a and passes through the center section in the circumferential direction of the connecting section 82 passes through the top section of the base section 51a.

In the resent example as well, the hook section 74b of the tension spring 73a is elastically pressed between the pair of guide sides 81a, 81b of the guide hole section 79 having a substantially triangular opening shape. Therefore, it is possible to prevent the hook section 74b from moving along the inner peripheral edge of the spring locking hole 53a, and it is possible to suppress occurrence of stick-slip. The configuration and operational effects of the other parts of the sixth example are the same as those of the fifth example.

When embodying the present invention, the structure of each example of the embodiment may be appropriately combined and implemented as long as no contradiction occurs.

EXPLANATION OF REFERENCE NUMBERS

1 Steering wheel
2 Steering gear unit
3 Input shaft
4 Tie rod
5, 5a Steering shaft
6, 6a Steering column
7 Universal joint
8 Intermediate shaft
9 Universal joint
10, 10a Gear housing
11 Vehicle body 12, 12a Tilt axis
13, 13a Displacement bracket
14, 14a Support bracket
15a, 15b, 15c, 15d Long hole in the up-down direction
16a, 16b, 16c, 16d Long hole in the forward-backward direction
17, 17a Adjustment rod
18, 18a Outer column
19, 19a Inner column
20, 20a Slit
21a, 21b, 21c, 21d Clamped plate section
22a, 22b, 22c, 22d Support plate section
23, 23a, 23b Adjustment lever
24, 24a Cam apparatus
25, 25a Driving-side cam
26, 26a Driven-side cam
27, 27a Engaging convex section
28, 28a Nut
29, 29a Thrust bearing
30, 30a, 30b Pressing plate
31 Spring
32 Lower bracket
33 Inner shaft
34 Outer shaft
35 Clamped section
36 Cylindrical section
37 Column fitting section
38a, 38b Lower hole
39a, 39b Sleeves
40 Installation plate section
41 Locking capsule
42 Bridge section
43a, 43b Side plate sections
44 Rib
45a, 45b Locking arm portion
46a, 46b Reinforcing protrusion
47a, 47b Bent plate section
48 Head portion
49 Male screw section
50 Disc spring
51, 51a Base section
52 Installation hole
53, 53a Spring locking hole
54 Center hole
55 Driving-side cam surface
56 Engaging convex section
57 Driving-side basal surface
58 Driving-side convex section
59 Driving-side stopper surface
60 Driving-side guide inclined surface
61 Center hole
62 Driven-side cam surface
63 Driven-side basal surface
64 Driven-side convex section
65 Driven-side guide inclined surface
66 Driven-side stopper surface
67, 67a Insertion hole
68, 68a Plate body
69, 69a Locking plate section
70 Base half section
71 Top half section
72, 72a Spring locking hole
73a, 73b Tension spring
74a, 74b Hook section
75a, 75b Hook section
76a, 76b, 76c Gap
77a, 77b Coil section
78, 78a Damper member
79 Guide hole section
80 Large-diameter hole section
81a, 81b Guide side
82 Connecting section

What is claimed is:

1. A steering device, comprising:
a steering column having a cylindrical shape and capable of pivotally displacing about a tilt axis arranged in a width direction with respect to a vehicle body or a member fixable to the vehicle body,
a displacement bracket provided in part of the steering column and having column side through holes passing through in the width direction,
a support bracket having an installation plate section, a pair of support plate sections coupled to the installation plate section and arranged on both sides in the width direction of the displacement bracket, and a pair of long holes in an up-down direction provided in the pair of support plate sections and extending in the up-down direction,
an adjustment rod inserting the column side through holes and the pair of long holes in the up-down direction in the width direction,
a pair of pressing sections provided in portions protruding from outside surfaces of the pair of support plate sections on both end sides of the adjustment rod, and
an expansion and contraction device for expanding or contracting a space between the pair of pressing sections,
wherein
one pressing section of the pair of pressing sections, a thrust bearing, and a nut are arranged in order outward on a portion of the adjustment rod protruding from an outside surface of one support plate section of the pair of support plate sections,
a locked member is arranged on the portion of the adjustment rod protruding from the outside surface of the one support plate section,
the locked member comprises an outer fitting section having an insertion hole through which the adjustment rod is inserted and externally fitted onto the adjustment rod, and an extended arm section arranged at part of the outer fitting section via a bent section and extending from the part of the outer fitting section toward an opposite side of the outer fitting section,
the extended arm section comprises a section shifted in the width direction from the outer fitting section, and
a tension spring is bridged between the section shifted in the width direction from the outer fitting section of the extended arm section and the support bracket, applying a force directed obliquely forward and upward to the locked member and applying a force in a direction moving away from each other to the outside surface of the one support plate section and an inside surface of the thrust bearing based on the force directed obliquely forward and upward applied to the locked member.

2. The steering device according to claim 1, wherein the force in the direction moving away from each other is applied to the outside surface of the one support plate section and the inside surface of the thrust bearing by the tension spring acting a moment with the bent section as a fulcrum around a virtual straight line extending in an extending direction of the bent section based on the force directed obliquely forward and upward applied to the locked member.

3. The steering device according to claim 1, wherein the extended arm section has an L-shape and comprises a base half section extending in the width direction from an outer circumferential edge of the outer fitting section and arranged at a right angle to the outer fitting section, and a top half section bent at a right angle from an end section in the width direction of the base half section toward an opposite side of the outer fitting section, and the section shifted in the width direction from the outer fitting section of the extended arm section is configured by the top half section.

4. The steering device according to claim 1, wherein the extended arm section has a flat plate shape, and extends obliquely in a direction toward a side opposite to the outer fitting section toward outside in the width direction from the outer circumferential edge of the outer fitting section, and the section shifted in the width direction from the outer fitting section of the extended arm section is configured by a top half section of the extended arm section.

5. The steering device according to claim 1, wherein the locked member is configured by the one pressing section.

6. The steering device according to claim 1, wherein the force directed obliquely forward and upward applied from the tension spring has an acting direction which is upward by 10 to 30 degrees from a direction of a virtual straight line orthogonal to the tilt axis and the adjustment rod.

\* \* \* \* \*